United States Patent [19]

Tamai et al.

[11] Patent Number: 5,262,820
[45] Date of Patent: Nov. 16, 1993

[54] CAMERA HAVING A BLUR DETECTING DEVICE

[75] Inventors: Keiji Tamai, Higashiosaka; Masataka Hamada, Osakasayama, both of Japan

[73] Assignee: Minolta Camera Kabushiki Kaisha, Osaka, Japan

[21] Appl. No.: 889,118

[22] Filed: May 26, 1992

[30] Foreign Application Priority Data

May 27, 1991 [JP] Japan .................................. 3-121314
May 27, 1991 [JP] Japan .................................. 3-121315

[51] Int. Cl.[5] ............................................. G03B 13/36
[52] U.S. Cl. ...................................... 354/402; 354/430
[58] Field of Search ............... 354/430, 400, 402, 406, 354/407, 408

[56] References Cited

U.S. PATENT DOCUMENTS 4,709,138 11/1987 Suda et al. .
4,733,264 3/1988 Hatase et al. .
5,012,270 4/1991 Sekine et al. ...................... 354/430

OTHER PUBLICATIONS

"Canon EOS 10S", Popular Photography, Feb. 1991, pp. 42–49.

Primary Examiner—Russell E. Adams
Attorney, Agent, or Firm—Burns, Doane, Swecker & Mathis

[57] ABSTRACT

In the disclosed invention, a camera has a blur detecting device which detects a possible blurring of a photograph in plural areas of an objective field through the use of image sensors such as CCDs. One of the plural areas is selected for detecting a blur therein. With this approach, a possible blur can be precisely detected at whichever location the main object of the scene to be photographed may exist within an objective field.

22 Claims, 20 Drawing Sheets

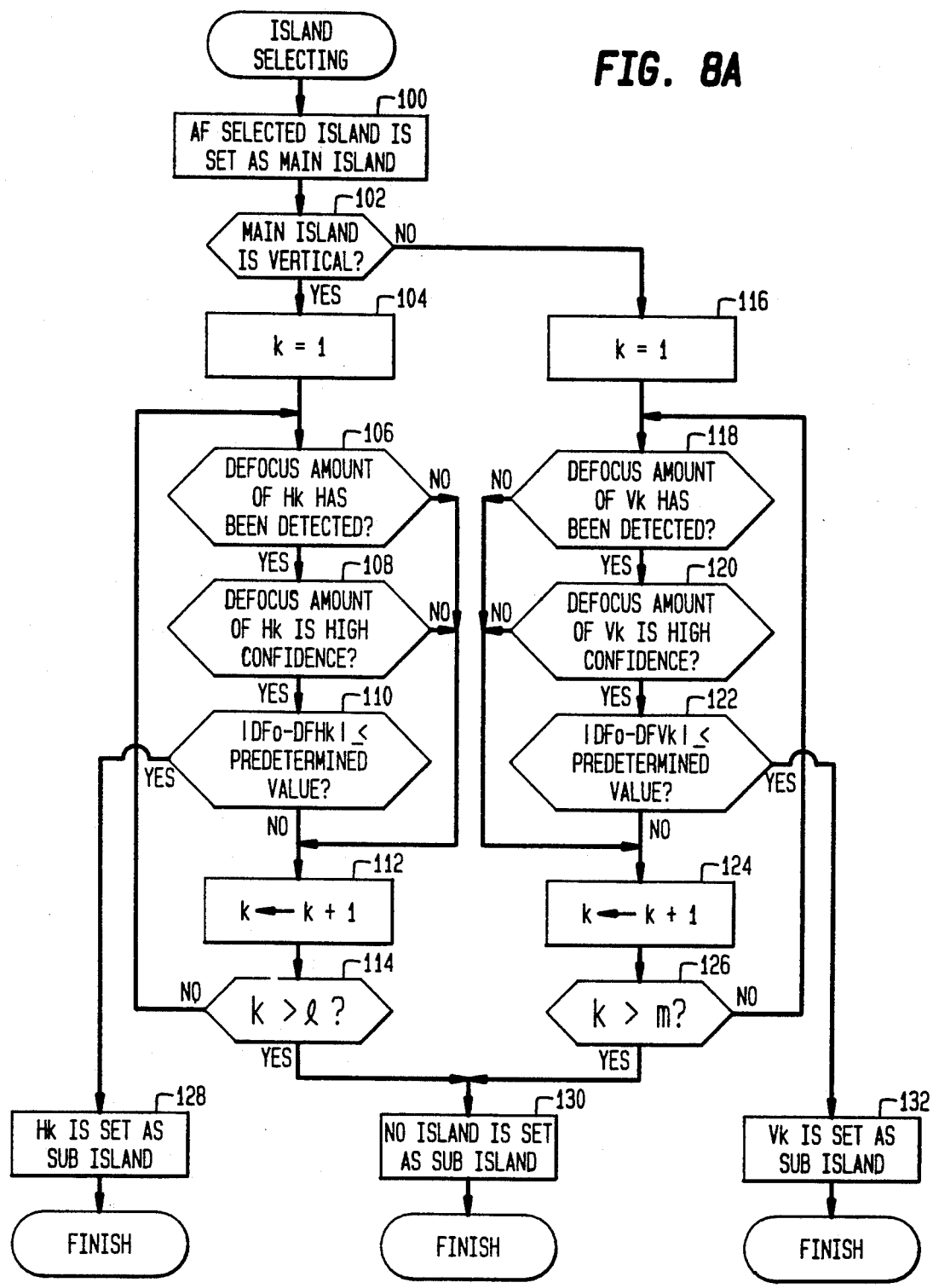

FIG. 18
INDICATING NO.
5 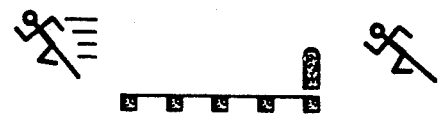
4 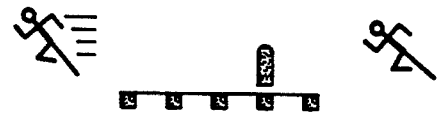
3 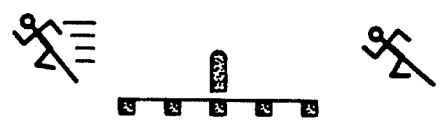
2 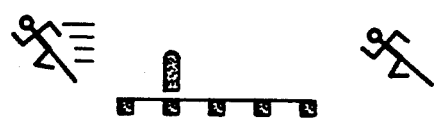
1 

FIG. 21
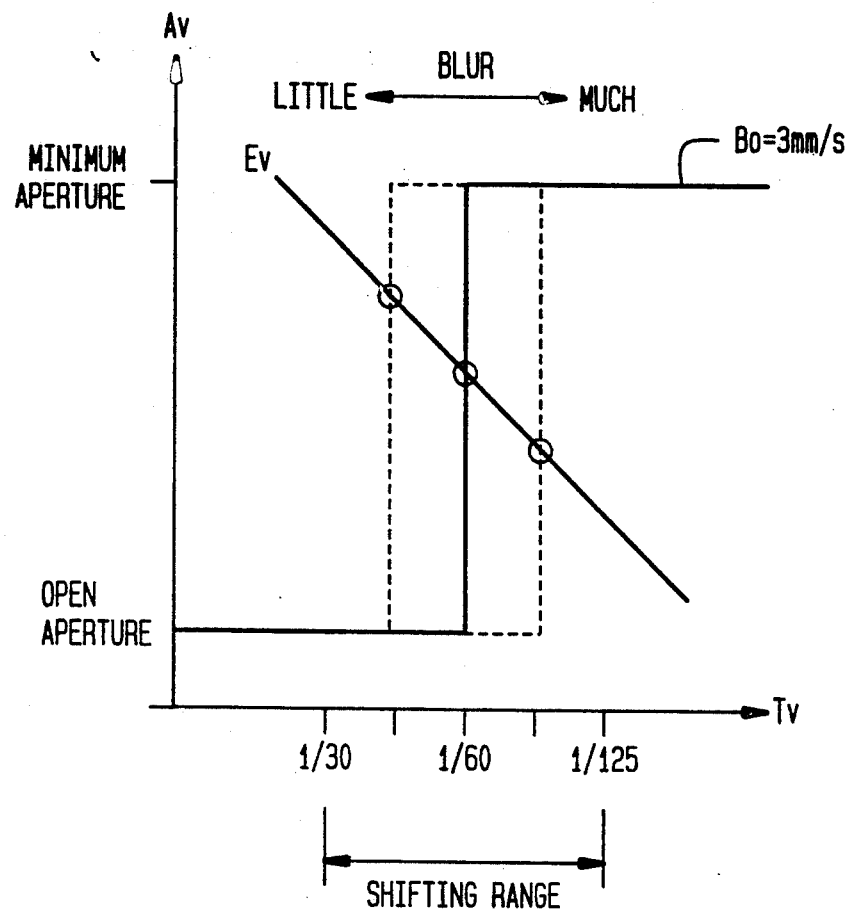
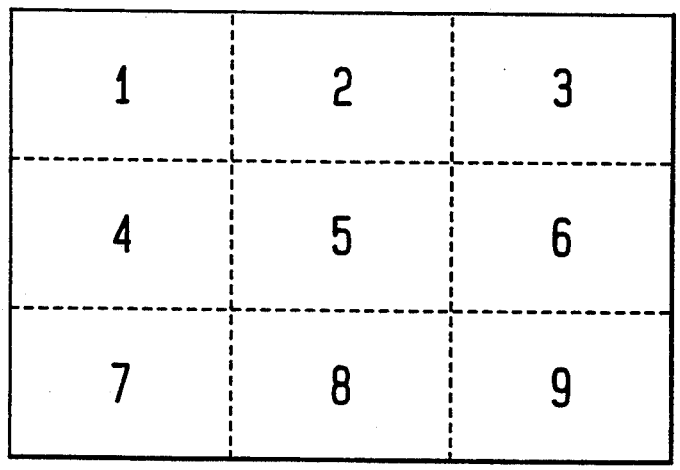
FIG. 22

CAMERA HAVING A BLUR DETECTING DEVICE

BACKGROUND OF THE INVENTION

1. Field of the Invention

The present invention relates to a camera having a blur detecting device.

2. Description of the Prior Art

Recently, a camera has been disclosed which has image sensors, such as CCDs, for detecting possible blurring of a photograph to be taken. This is achieved by detecting movement of a picture image formed on the CCD. In this heretofore disclosed kind of camera, a blur condition is detected only at one location within an objective field. Consequently, blur detection is performed in the center part of the image, where there is the highest possibility that the main object of the image to be photographed will appear.

When using the above-mentioned camera having a blur detecting device, a possible blurring of the main object in the photograph can be detected only when the main object is in the center part of an objective field. When the main object is not in the center part, a blurring of the background is detected, so that a warning to the operator and blur-correcting operations using the detected blur data can cause undesired operations of the camera.

A multi-AF camera capable of detecting a focus condition in plural areas of an objective field is known. Also, a camera which detects blur by using the same image sensors as those used for focus detection has been disclosed. For example, U.S. Pat. Nos. 4,733,264 and 4,709,138 disclose such a camera.

Recently, a camera which performs both of the above-mentioned two operations, i.e. it is capable of a multi-AF and it detects blur by using image sensors for focus detection, has been disclosed. This camera has two modes, a normal mode and a blur detecting mode. In the normal mode, focus detection is carried out in plural areas of an objective field, but blur detection is not carried out. In the blur detecting mode, focus detection is carried out only in the center part of an object field, and blur detection is carried out by using image sensors provided at the center part of the object field. Therefore, in this camera, blur detection of a main object can still only be performed when the main object is in the center part of an objective field.

SUMMARY OF THE INVENTION

It is an object of the present invention to provide a camera that is capable of detecting a blur condition in plural areas of an objective field.

It is a further object of the present invention to provide a camera capable of detecting focus in plural areas of an objective field and detecting a blur condition in an area where the focusing operation is performed.

It is a yet another object of the present invention to provide a camera capable of detecting a blur condition in plural areas of an objective field, in which a photographer can manually select an area within the objective field in which the blur detection will take place.

Other features and advantages of the present invention will become apparent from the detailed description to follow.

BRIEF DESCRIPTION OF THE DRAWINGS

The object and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 8(a) is a flowchart of an island selecting operation in one embodiment of the invention.

FIG. 18 is a sequence of illustrations showing a movement indicator display.

FIG. 21 is an exposure program in a panning mode.

FIG. 22 is an illustration of a divided area sensor that is used as an image sensing means.

DETAILED DESCRIPTION OF THE PREFERRED EMBODIMENTS

Embodiments of the present invention are described with reference to the accompanying drawings.

Figure 1:
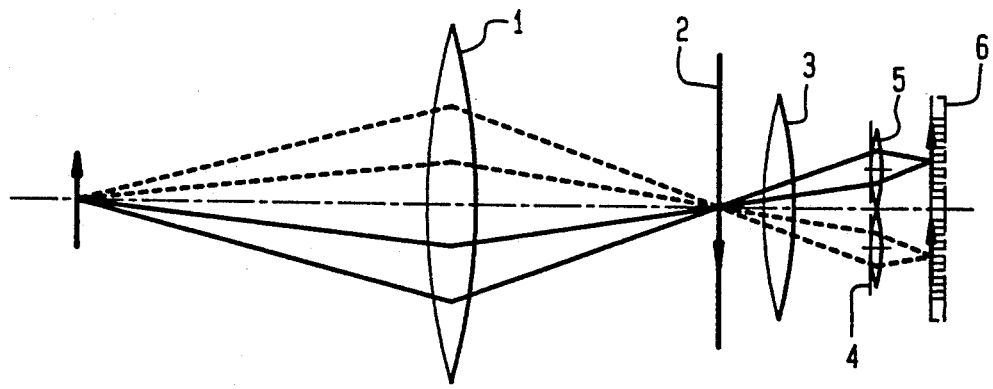
FIG. 1 is an illustration of the principle of operation of a focus detecting device which can be used in a camera embodying the present invention.

First, a focus detecting device of the type that can be used with the present invention will be described. FIG. 1 is an illustration of the focus detecting principle of operation of a camera which uses the so-called TTL (Through The Lens) phase difference detecting method. In FIG. 1, incident light passes through a photographing or objective lens 1, and forms an image on a plane 2. The location of this plane 2 is optically equivalent to the location of the frame of film that is to be exposed in the camera. The light passes through a condenser lens 3 and is divided into two light bundles by an aperture mask 4. Each light bundle passes through a respective separator lens 5, and forms an image on an associated area of an image sensor 6. The two image areas on the image sensor 6 are respectively identified as a standard area and a reference area. The distance between the two images which are formed on the image sensor 6 is detected, and from this a defocus amount is determined. Namely, by comparing a predetermined distance with the distance between two images on the standard area and the reference area of the image sensor 6, a focusing condition such as front focus or rear focus can be discriminated.

Figure 2A:
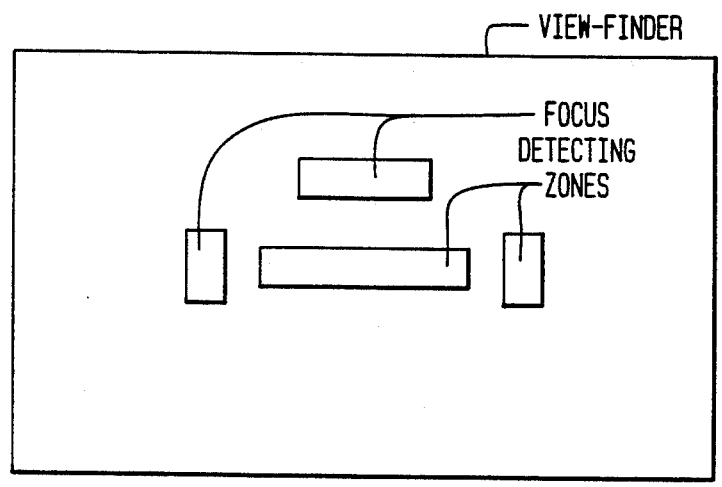
FIG. 2(a) is an illustration showing focus detecting zones in the view-finder of a camera in one embodiment of the invention.

FIG. 2(a) shows possible detecting zones in the viewfinder of a camera which is capable of multi-focus detection. In an embodiment of the present invention, there are four focus detecting zones. Focus condition data at a point corresponding to each focus detecting zone can be detected by using four focus detecting devices of the type shown in FIG. 1. In a camera of the type to which the present invention is applied, a photographic magnification is calculated on the basis of data obtained from the four focus detecting zones and the focal length of the photographing lens. By using the calculated magnification and considering the size of an object, the particular zone in which the object is located can be automatically determined. Then, the photographing lens is driven to attain focus in the so-determined zone. This technique is disclosed in greater detail in U.S. Pat. No. 5,053,801, for example.

Figure 2B:
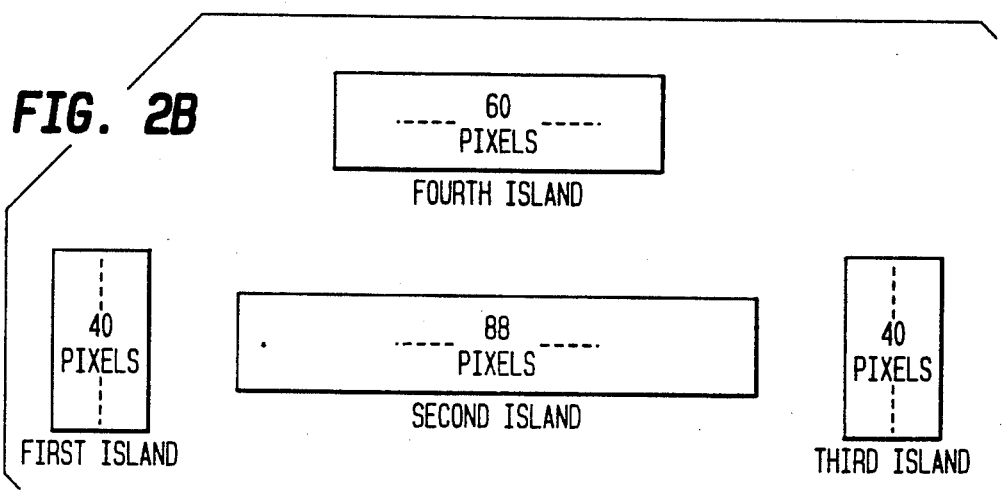
FIG. 2(b) is an illustration of CCD line sensor groups corresponding to the focus detecting zones in FIG. 2(a).

FIG. 2(b) shows CCD line sensor groups corresponding to the focus detecting zones shown in FIG. 2(a), respectively. Each CCD line sensor group is equal to the image sensor 6 shown in FIG. 1. The CCD line sensor groups shown in FIG. 2(b) are on the standard area of the image sensor 6 in FIG. 1. In the vicinity of each sensor group, an illuminance monitor (not shown) is provided so as to control the integrating time of CCD integration. As shown in FIG. 2(b), the four CCD line sensor groups are named the first island, the second island, the third island and the fourth island, respectively. The longitudinal direction of the line sensors of the first and third islands is perpendicular to that of the second and fourth islands. In the present embodiment, the first and third islands comprise a line sensor consisting of forty picture elements, the second island eighty-eight elements, and the fourth island sixty elements. On the basis of the focus detecting data from the sensors of the four islands and the size of the object, a determination is made as to which island contains the main object. Then, by using the focus detecting data of the island which is determined to contain the main object (hereinafter, referred to as the "Selected AF island"), the lens driving amount is calculated. According to the calculated lens driving amount, the photographing lens is driven, so that the object is brought into focus.

Although four focus detecting zones are disclosed in the present embodiment, it is not necessary that they be four in number. If multi-focus detection is possible, the number of focus detecting points can be any desirable number. Also, it will be appreciated that the number of pixels of each island is not fixed to be the above-mentioned numbers.

Figure 2C:
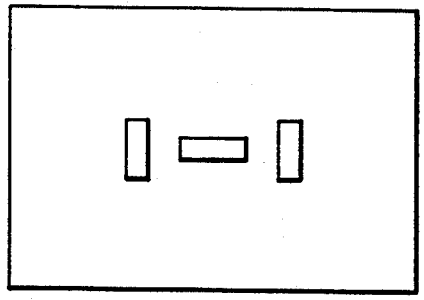
FIGS. 2(c)–2(g) are illustrations showing focus detecting zones in the view-finder of a camera in other embodiments.
Figure 2D:
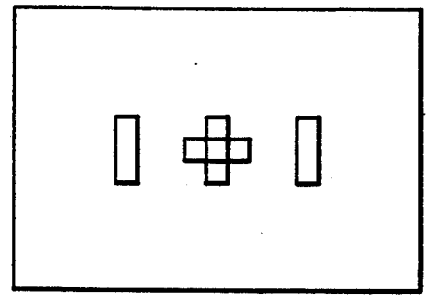
Figure 2E:
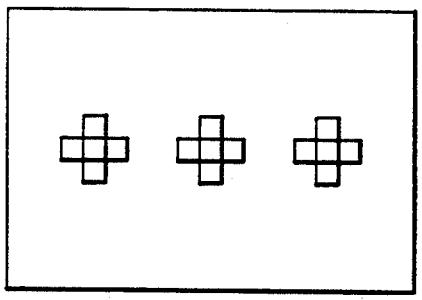
Figure 2F:
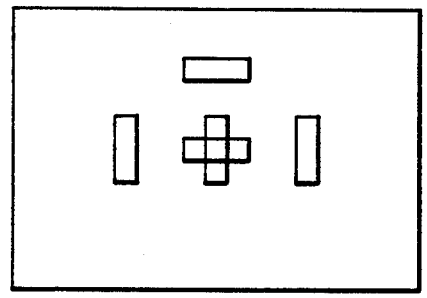
Figure 2G:
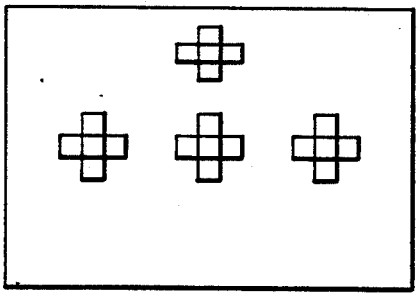

FIGS. 2(c) to 2(g) show other embodiments of the present invention. FIGS. 2(c) to 2(e) show focus detecting zones of a camera having three focus detecting zones. FIGS. 2(f) and 2(g) show focus detecting zones of a camera having four focus detecting zones. A camera whose focus detecting zones are shown in FIGS. 2(d) to 2(g) has focus detecting zones comprising two islands that are perpendicular to each other.

In the present invention, a blur is detected by using the same CCD line sensors as those that are used for the automatic focus detection. Referring to the embodiment of FIG. 2(a), a blur in the horizontal direction is detected by using the sensors of the second or fourth island. A blur in the vertical direction is detected by using the sensors of the first or third island.

Figure 3:
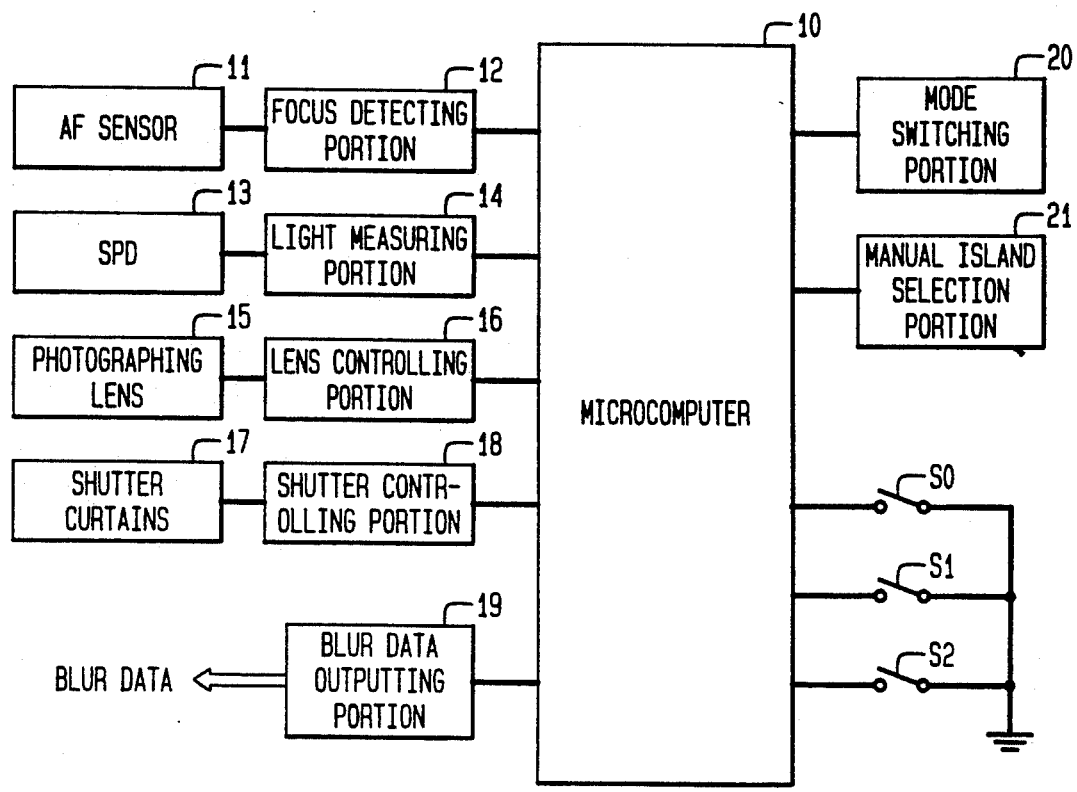
FIG. 3 is a block diagram of the control circuit portion of a camera of the type to which the present invention can be applied.

FIG. 3 is a block diagram of the control circuit for a camera of the type to which the present invention can be applied. In FIG. 3, a microcomputer 10 controls a photographing sequence such as lens driving and exposure, and furthermore, it performs calculations concerning the photographing operation such as exposure calculation, focus detection calculation, and blur calculation. An AF sensor 11 denotes the four CCD line sensor groups shown in FIG. 2. On the basis of the result detected by the AF sensor 11, a focus detecting portion 12 provides focus detecting data to the microcomputer 10. Moreover, in the present invention, the focus detecting portion 12 also generates image data for detecting a blur condition, since a blur is detected by using the image data of the AF sensor. A light measuring portion 14 measures an object luminance on the basis of the output of a photoelectric converting element SPD (Silicon Photo Diode) 13, and provides the light measuring data to the microcomputer 10.

A lens controlling portion 16 controls general lens movement such as driving of a photographing lens 15, and provides lens data to the microcomputer 10. The lens data includes a focal length and an aperture value which are generated by the photographing lens 15 (to be more precise, from a lens ROM). Shutter curtains 17 of a focal plane shutter comprises a front curtain and a rear curtain, and are driven by a shutter controlling portion 18. A blur data outputting portion 19 has output terminals for providing blur data calculated by the microcomputer 10. The output data is used to display how much the object might blur in a photograph or for correcting the blur with an optical system and such. A mode switching portion 20 is for switching between modes such as a portrait photography mode and a scenery photography mode, in order to control the camera according to a particular object or photographic condition. The switching can be carried out by using a dial type switch or by means of an external recording medium such as an IC card. A manual island selecting portion 21 has input devices for allowing the photographer himself to select islands to be used for the blur detection. By using the manual island selecting portion 21, the photographer can select islands for blur detection at will.

A switch S0 is the power switch of the camera. When the switch S0 is on, the camera starts operating. A switch S1 is turned on under the first depression of a release button (not shown) and starts light measuring and focus detection. A switch S2 is turned on under the second depression (deeper than the first depression) of the release button and starts a shutter release operation.

Figure 4:
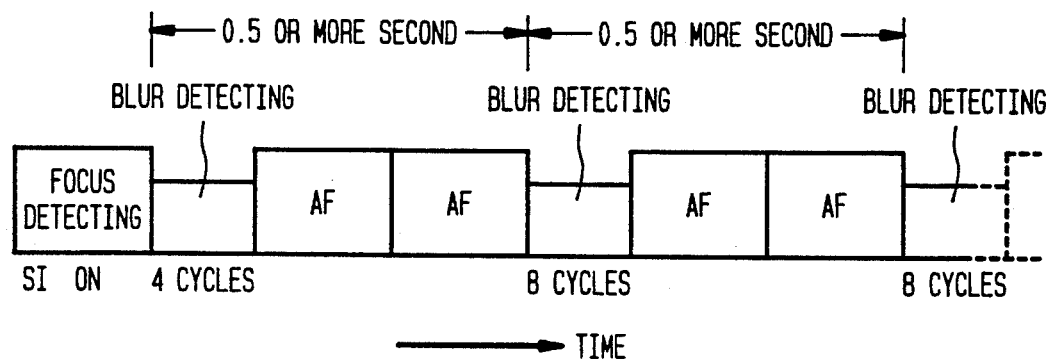
FIG. 4 is an illustration of a blur detecting sequence of the present invention.

FIG. 4 is an illustration of the blur detecting sequence of operation of a blur detecting device according to the present invention. In the present invention, since the CCD for automatic focusing (AF) is also used to detect blur, the blur detection is carried out between the AF operations, as shown in FIG. 4. In further detail, at first, when the release button of a camera is depressed halfway and S1 is on, the focus detection starts. After the focus detecting data of all islands is obtained by this focus detecting operation, the blur detection is carried out one time before the focusing operation resumes. In this case, the blur detection is performed for four cycles. These cycles are described later. Then, the AF operation starts. The AF operation includes the focus detecting operation, calculating the lens driving amount, and driving the photographing lens. After that, the AF operation of "focus detecting—lens driving amount calculating—lens driving" is repeated until 0.5 second or more passes since the starting time of the first blur detection. In FIG. 4, the AF operation is repeated twice for 0.5 second, for example. This number of times of the AF operation is changeable according to the object luminance. When the object luminance is low, the integrating time of the CCD is lengthy, so that the number of times that the AF operation is performed is reduced.

After 0.5 second or more passes, the blur detection starts again. This time, the blur detection is performed for eight cycles. From this time on, the AF operation and the eight-cycle set of blur detection are carried out alternately. As described above, a period of at least 0.5 second or more is required between a blur detection and the next blur detection. During this period, the AF operation is repeated. If the period is shorter than 0.5 second, the AF operation or another operation is disturbed. That is, if the number of times that blur detection is carried out is increased by shortening the period, it takes too much time to perform the blur detection, so that another operation is delayed. This sequence is continued until the release button is further depressed (S2 is turned on) and the release operation starts.

Figure 5:
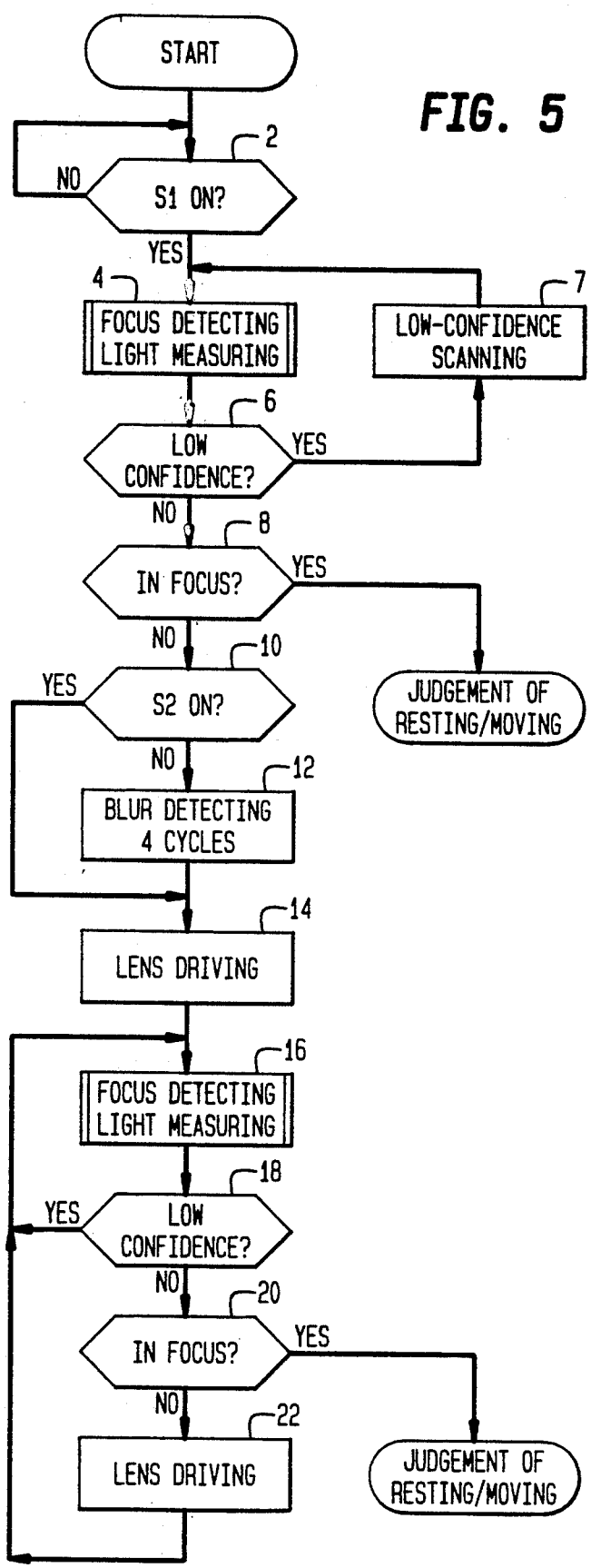
FIG. 5 is a flowchart showing an operation of a camera of the type to which the present invention can be applied.

FIG. 5 is a flowchart showing the operation of the microcomputer from the start of a photographing operation. When S1 is on in step #2, the focus detection and the light measuring begin in step #4. In step #6, a determination is made whether the confidence value of the focus detecting data is low. When the confidence value of the data is low, a reliable AF operation is not possible, so that low confidence scanning is carried out. The purpose of low confidence scanning is to find proper focus detecting data by driving a photographing lens. Generally, a largely out-of-focus condition makes focus detecting data have a low confidence value. (For example, as the defocus amount increases, the contrast of the object image formed on the CCD decreases, and the focus detecting data has a low confidence value.) The photographing lens is therefore driven in order to find proper focus detecting data. After finding proper focus detecting data, the photographing lens is stopped and the focus detecting operation starts again. When the confidence value of the focus detecting data is determined not to be low in step #6, a decision is made whether the camera is in focus in step #8. If the lens is in focus, a determination is made whether the object is moving. The determination of whether the object is moving is described later. If the lens is not in focus, the program goes to step #10. In step #10, S2 is detected to be on or off. When S2 is off, the blur detection is performed for four cycles in step #12. After the blur detection, the lens is driven in step #14. When S2 is on, the lens is driven without the blur detection. In step #16, the focus detection and the light measurement are again performed, and the confidence value of the focus detecting data is determined. If it is low, the focus detection is again performed, but low confidence scanning is not carried out. In step #20, a determination is made whether the object is in focus. When the object is in focus, the program goes to the next step where the object movement is detected. When the object is not in focus, the lens is driven.

Figure 6:
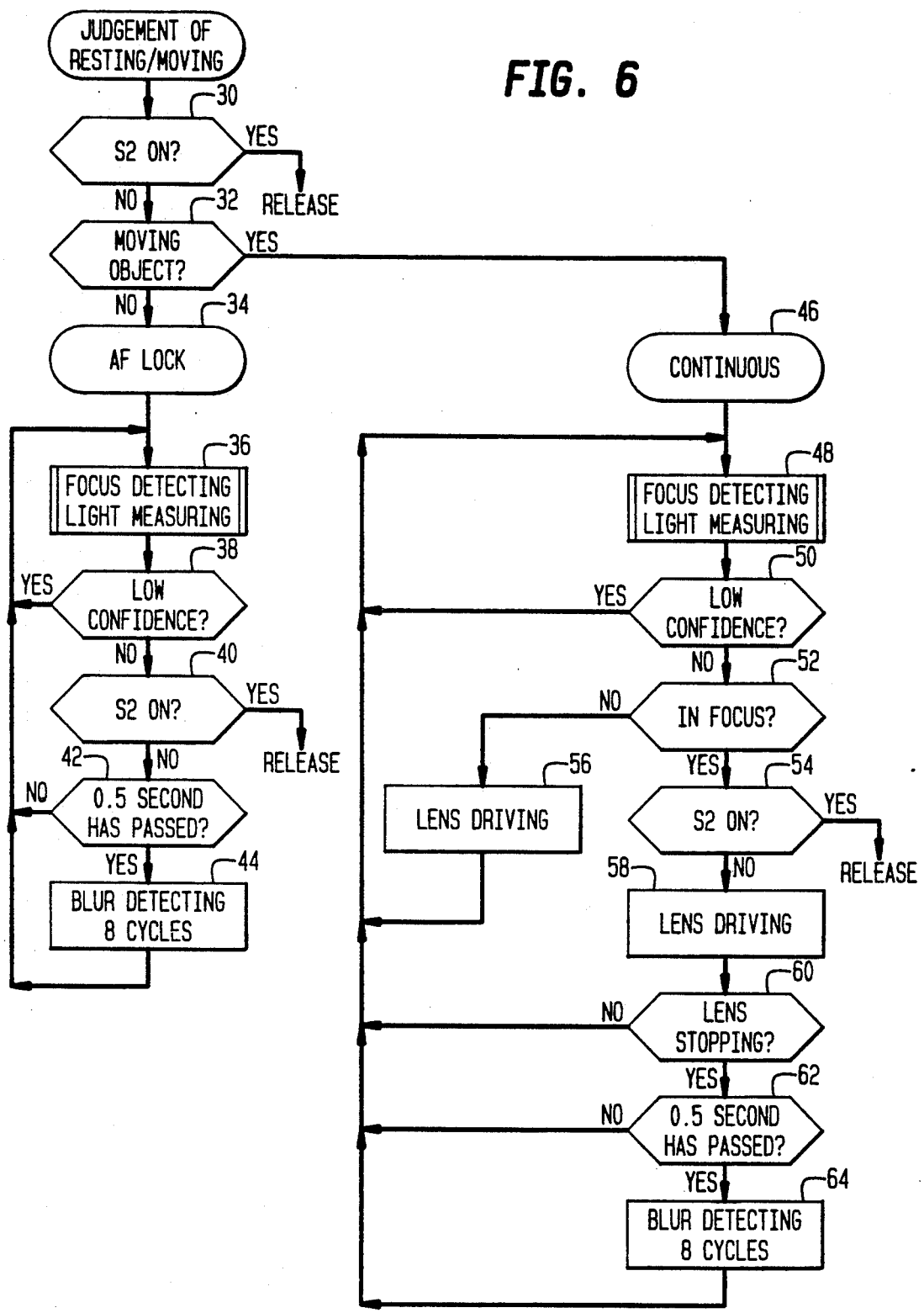
FIG. 6 is a flowchart showing further operation of a camera of the type to which the present invention can be applied.

FIG. 6 is a flowchart which describes camera operations that take place after a determination is made whether an object is moving. When S2 is turned on in step #30, the release operation starts immediately. When S2 is off, a determination is made whether the object is moving in step #32. Here, "moving" means that an object is moving in the direction of the optical axis of the camera.

When the object is not moving, the focusing operation is not performed any more (AF lock). In step #36, the focus detection and the light measurement are carried out. In step #38, a determination is made whether the confidence value of the focus detecting data is low. In step #40, S2 is detected to be on or off. When S2 is on, the release operation starts. When S2 is off, the microprocessor detects whether 0.5 second or more has passed since the former blur detection. If it has passed, an eight-cycle blur detection is performed in step #44. If it has not passed, the focus detection and the light measurement are performed again (in step #36). After that, this operation is repeated until S2 is turned on.

When the object is detected to be moving in step #32, the focusing operation is continued according to the object movement (continuous). The focus detection and the light measurement are performed in step #48, and the confidence value of the focus detecting data is determined in step #50. In step #52, a determination is made whether the object is in focus. When it is in focus, the state of switch S2 is detected in step #54. When it is not in focus, the lens is driven and the focus detection and light measurement operations are carried out again. In step #54, when S2 is on, the release operation starts. When S2 is off, the lens is driven. This lens driving in step #58 is for correcting defocus which occurs after some time passage because of the object movement, even when the lens is in focus. In step #60, a determination is made whether the lens driving to correct focus is finished. When the lens is still being driven, the focus detection and the light measurement are performed again. When the lens is stopped, the microprocessor determines whether 0.5 second or more has passed after the previous blur detecting operation in step #62. If it has passed, the eight-cycle blur detection is performed in step #64. If it has not passed, the program goes back to step #48. After that, this operation is repeated until S2 is turned on. After S2 is turned on, the release operation starts. However, the blur detecting operation is not carried out after the release operation.

A practical operation for detecting blur is described hereinafter. The blur detecting operation of the present invention is generally comprised of four operations. The four operations are "Island Selecting", "Block Selecting", "Blur Calculating", and "Averaging". These four operations are described in order, hereinafter.

[1] Island Selecting

The Island Selecting operation selects proper islands for blur detection from among the above-mentioned four islands. In the present invention, a blur amount is detected in the horizontal direction and in the vertical direction. Therefore, two islands that are perpendicular to each other are selected from among the four islands. The manner in which the islands are selected is described hereinafter. For one island, the selected AF island is used. For the other island, an island is selected which is perpendicular to the selected AF island and whose defocus amount (hereinafter referred to as DF) differs from that of the selected AF island by 100 μm or less.

One of the purposes of the present invention is to provide a camera having a blur detecting device for detecting the relative blur of the main object in a scene to be photographed. To achieve this purpose, the AF island that is determined to contain the main object is selected first. Then, another island which is perpendicular to the selected AF island is selected. In this approach, the island which is selected first and contains the main object is identified as a main island, and the island which is selected second and perpendicular to the main island is identified as a sub island. FIGS. 7(a) to 7(d) are illustrations showing two islands selected by the above described technique.

Figure 7A:
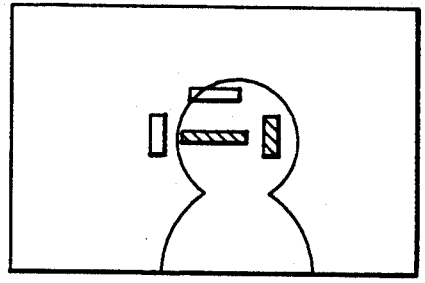
FIG. 7 is a sequence of illustrations showing an island selecting method which is based on the difference of points of a main object.
Figure 7B:
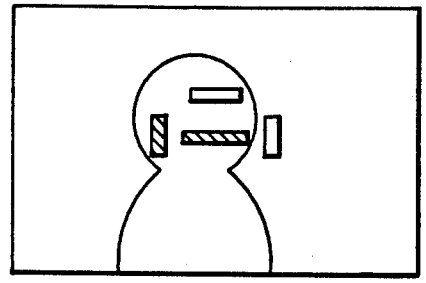
Figure 7C:
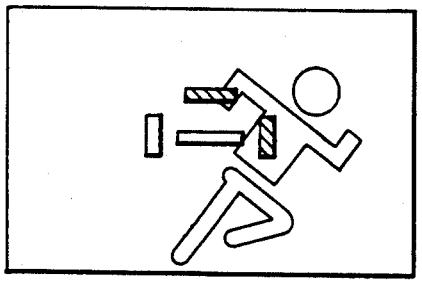
Figure 7D:
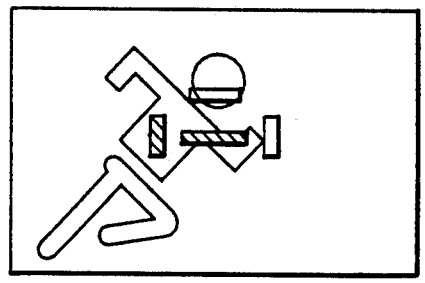
Figure 7E:
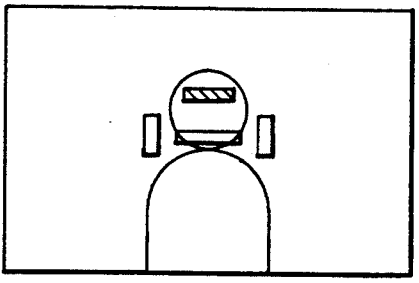
Figure 7F:
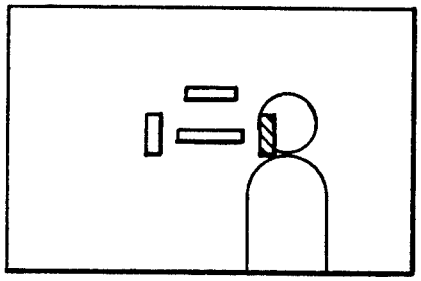

When an island which is perpendicular to the selected AF island and fulfills the above described conditions does not exist (when the DF difference is more than 100 μm or DF cannot be detected because of low illumination, for example), the AF island is selected as a main island, and the sub island is not selected. In this case, the blur is detected using only the main island. FIGS. 7(e) and 7(f) show this case. In FIG. 7(e), the fourth island is the selected AF island, and the first and third islands contain the background, so that they do not fulfill the above described conditions. Therefore, the blur detection is performed only with the fourth island. In FIG. 7(f), the third island is the selected AF island, and the second and fourth islands which are perpendicular to the third island do not fulfill the above described conditions. Therefore, the blur detection is performed with only the third island.

The above-described technique for selecting islands for use in blur detection can be varied, as described hereinafter.

When a photographer takes photographs manually by using a focus aid camera (referred to as an FA camera), the second island is selected as a main island and the sub island is not selected. The blur detection is performed only with data from the main island (the second island). In this manner, since the lens is manually shifted in FA photography, the lens position data can not be obtained, so that the distance data can not be calculated. As a result, a determination cannot be made as to which point in the photographic scene contains the main object. Therefore, the blur detection is performed by the center island which has the highest probability of containing the main object, that is, the second island.

In a camera where multi-focus detection is possible and the photographer can select any island for focusing (a local AF function), the island selected by the photographer is selected as the main island, and the blur detection can be carried out by means of the main island. This result is due to the fact that the main object can be considered generally to exist in an island selected by the photographer. In the case where the local AF function is used, the photographer selects islands with the manual island selecting means 21 shown in FIG. 3.

FIG. 8(a) is a flowchart of the above-described island selecting technique. In this flowchart, a general island selecting technique is shown. In this example, the number of horizontal islands, from H1 to Hl, is l, and the number of vertical islands, from V1 to Vm, is m. The indices (1 to l, and 1 to m) are the numbers of the islands which are numbered in order from an island nearest to the main island when the main island has been selected. The flowchart of the island selecting technique is described hereinafter with reference to FIG. 8(a).

In step #100 the selected AF island is set as the main island. In step #102, a determination is made whether the selected main island is vertical or horizontal. When it is vertical, the sub island is selected from one of the horizontal islands. In step #104, k is set at 1 and in step #106, a decision is made whether the defocus amount of an island Hk has already been detected. In general photography, DF of all of the islands is detected, so that the program goes to step #108. The answer will be "NO" in step #106 only in special cases, such as the case when only one island is used under the FA mode or the local AF mode as described above. When the answer is "YES" in step #106, the confidence level of the DF data for the island Hk is detected in step #108. In the case where the object luminance is low, the DF data has a low confidence value, so that the answer is "NO". In step #110, the difference between DF of the main island (DFo) and DF of the island Hk (DFHk) is compared to a predetermined value. The predetermined value is 100 μm in this example of the present invention. When the DF difference is not more than the predetermined value, the island Hk is selected as the sub island in step #128. Thus, the island selecting process is finished. When one of the answers in the steps #106 to #110 is "NO", 1 is added to k in step #112. Then, the program goes back to step #106 through step #114, and the same judgements are carried out with respect to the next island. When all of the l horizontal islands do not fulfill the conditions in steps #106 to #110, the answer in step #114 is "YES", and in step #130, a determination is made that there is no sub island.

When the main island is horizontal, the sub island is selected from one of the vertical islands by judgements carried out in steps #116 to #126. The selecting operation is the same as the case in which the main island is vertical, and therefore the description of the selecting operation in the case where the main island is horizontal will be omitted here. Thus, the two islands for the blur detection are selected from among the vertical islands and the horizontal islands, respectively.

When there are islands perpendicular to each other in the same zone as shown in FIGS. 2(d) to 2(g), the island which is in the same zone as the main island is given precedence as a sub island by numbering as described before. Alternatively, it is possible to select as the sub island only an island which is in the same zone as the main island.

Figure 8B:
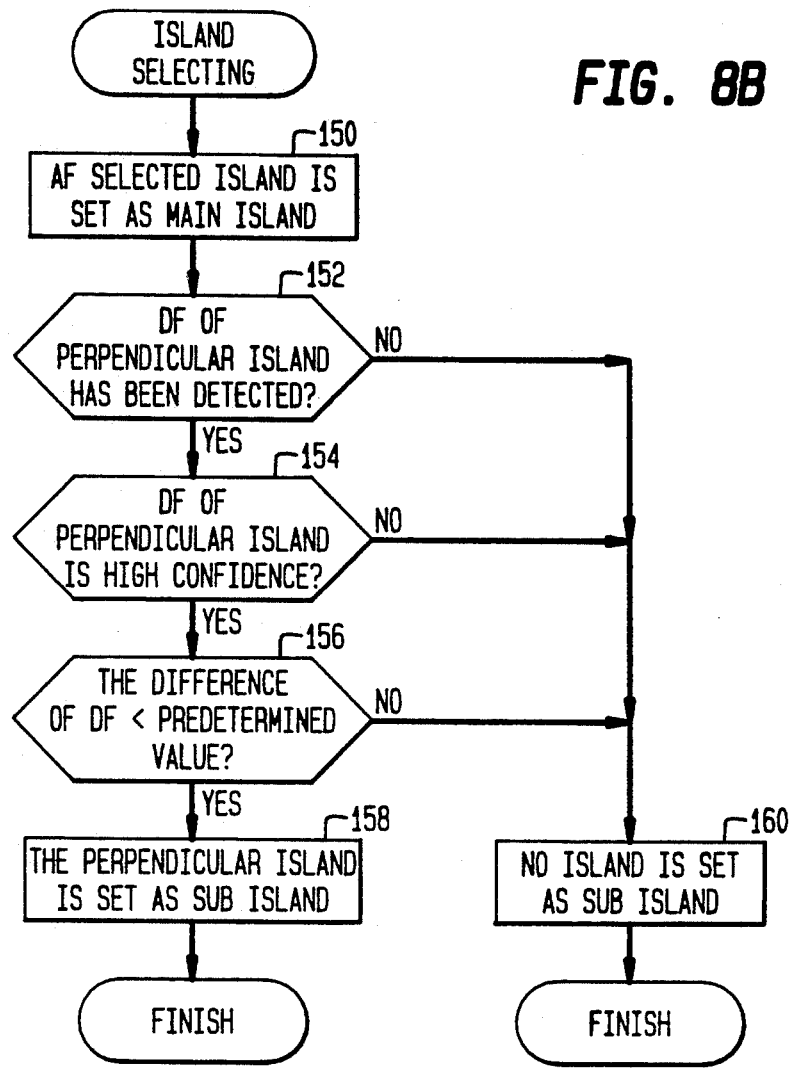
FIGS. 8(b) and 8(c) are flowcharts of an island selecting operation in other embodiments.

FIG. 8(b) is a flowchart of the island selecting technique for the case where every focus detecting zone comprises two islands that are perpendicular to each other, as shown in FIGS. 2(e) and 2(g). When the island in the same focus detecting zone does not fulfill the conditions in steps #152 to #156, a sub island is considered not to exist. If denied, the step #156 can be omitted because the islands in the same zone are considered to detect the focus condition of the same object.

Figure 8C:
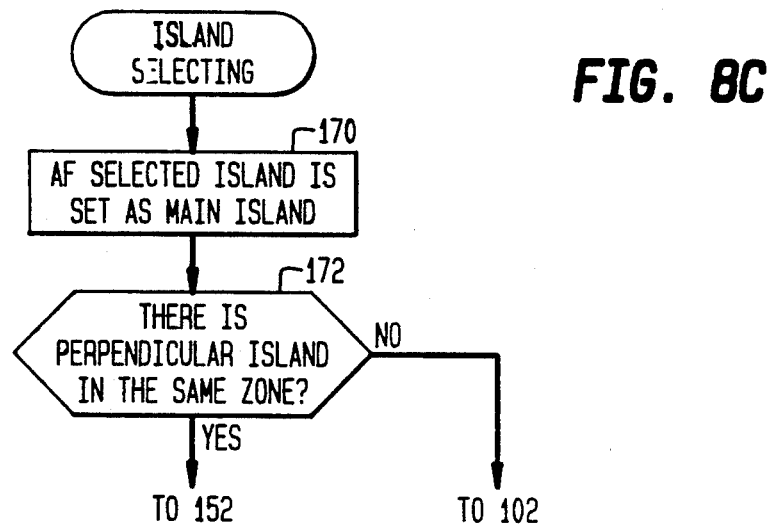

FIG. 8(c) is a flowchart of the island selecting technique for the case where some but not all focus detecting zones comprise two islands that are perpendicular to each other, as shown in FIGS. 2(d) and 2(f). This flowchart is a combination of the flowcharts of FIGS. 8(a) and 8(b).

[2] Block Selecting (including selections of standard and reference areas)

The Block Selecting process selects plural pixels (sixteen pixels in the present embodiment) as a detecting block among pixels which compose islands selected in the manner described in Section [1] above. A block selected in a main island is a main block, and one selected in a sub island is a sub block. These selected blocks are considered to be standard detection areas, and their pixel data is used for the blur calculation.

The block selecting technique is described hereinafter with reference to FIG. 9. The same operation is carried out in the horizontal direction and in the vertical direction. Therefore, blur detection in the horizontal direction only will be described. In FIG. 9, the total number of pixels in the selected island is 21 (No. 1 to No. 21), and five pixels of the total are selected as a detecting block. In this embodiment, three blocks, from the first to third, are preset as shown in FIG. 9. The ends of the island are not selected as standard detection areas. This condition is due to the possibility that the blur detection could become impossible since the range of movement of an object could go beyond the ends of the island, if they are selected as part of a standard detection area. In the present embodiment, a block whose defocus amount is the least is selected as the block that is most proper for blur detection among the above-mentioned three blocks, for example. When the contrast of the block is not more than a predetermined value, the block whose contrast is highest among the first to third blocks is selected.

Figure 9A:
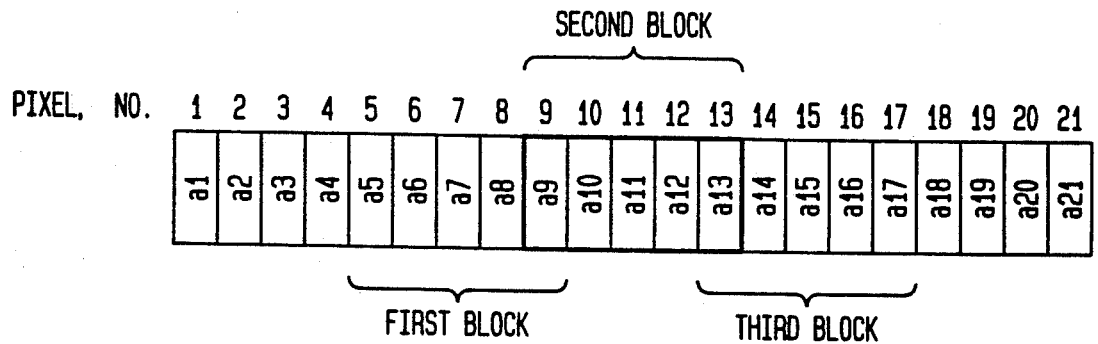
FIG. 9 is a sequence of illustrations showing block selecting.

In FIG. 9(a), the data that is obtained upon the first integration of the CCD after S1 is turned on is represented for each pixel as a1-a21. The pixel data a1-a21 is dumped and stored in a memory. After the dumping is finished, the CCD integrating operation starts again, and at the same time, the block selecting operation is performed. If the defocus amount of the second block (Pixel No. 9 to Pixel No. 13) is the least, the pixel data (a9 to a13) of the second block is stored as standard data.

Figure 9B:
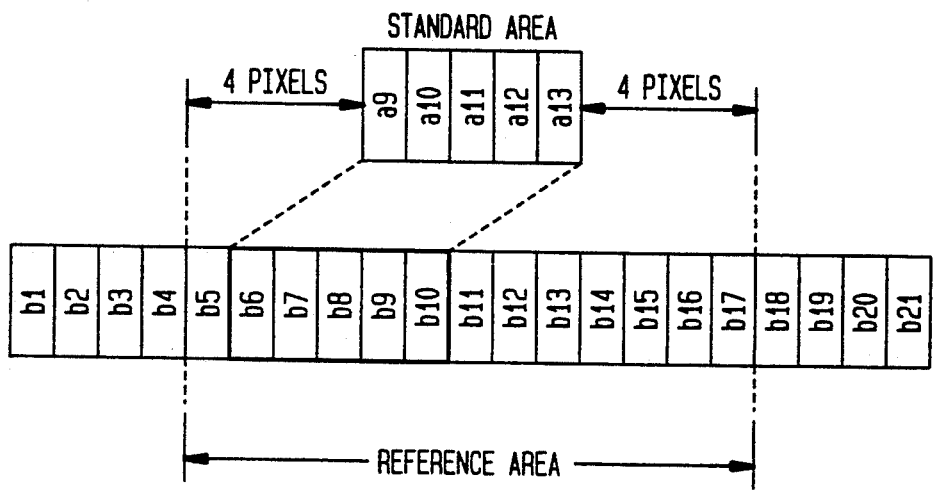

In FIG. 9(b), b1-b21 represent pixel data after completion of the second integration. This data is also dumped, and after the dumping is finished, another integrating operation starts. An area which is wider by four pixels in the right and left directions from each of the ends of the pre-memorized standard area (No. 5 to No. 17) is considered as a reference area. Pixel data (b5 to b17) in this area is considered as reference data. Then, correlation calculating and interpolation calculating are carried out to calculate movement of an object. The specific calculations are described in connection with the description of Blur Calculating below. After the movement of an object has been calculated, when the object moves left as much as three pixels, for example, the next standard area is shifted left as much as three pixels from the former standard area (No. 9 to No. 13). The next standard area is No. 6 to No. 10 in this example. After the new standard area is set, the pixel data (b6 to b10) of the new standard area is stored as the next standard data.

Figure 9C:
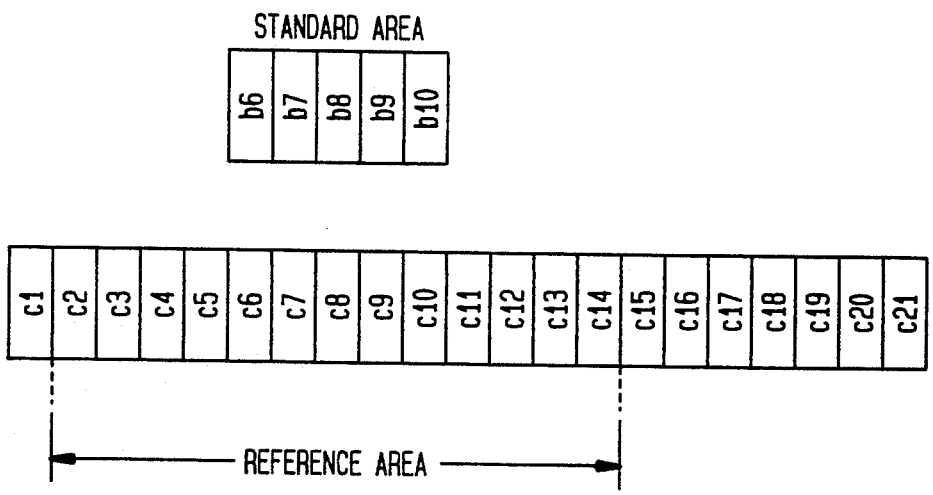

In FIG. 9(c), c1-c21 represent pixel data obtained after the third integration. As described above, an area which is wider by four pixels each in the right and left directions (No. 2 to No. 14) from the standard area (No. 6 to No. 10) is considered as a reference area. The blur calculation is performed between the standard data b6 to b10 and the reference data c2 to c14.

Figure 10:
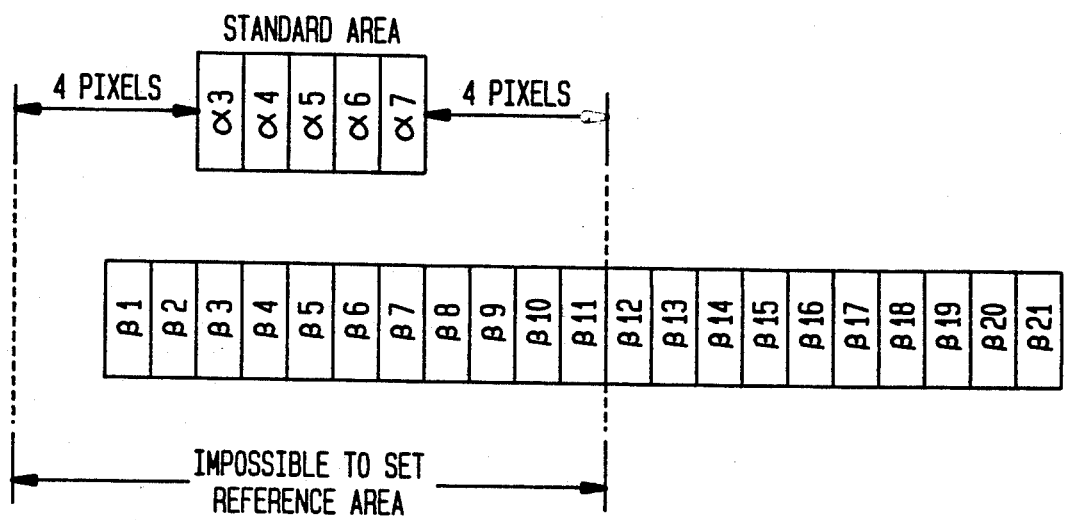
FIG. 10 is an illustration showing block selecting.

The blur detection is carried out by repeating the above described selections of the standard and reference areas alternately. When the image contrast of the standard area decreases to a predetermined value or less, the block whose contrast is highest among the above-mentioned first to third blocks is selected as a standard area again. When a reference area can not be established because the standard area is at an end of the island as shown in FIG. 10, another block whose contrast is highest is selected again. However, when the contrast of the subsequently selected block is not more than the predetermined value, a decision is made that a standard area does not exist, so that the blur calculating step is not carried out.

[3] Blur Calculating

The Blur Calculating process is roughly divided between correlation calculating and interpolation calculating. First, the correlation calculation is described. In the following description of the blur calculating process, the case of detecting a blur in the horizontal direction is described.

The standard data is expressed as "s(x) to s(x+4)", the reference data is expressed as "r(x−4) to r(x+8)", and the correlation value is expressed as follows:

$$H(n) = \tfrac{1}{2}|s(x) - r(x + n)| + \qquad (1)$$
$$|s(x + 1) - r(x + 1 + n)| + |s(x + 2) - r(x + 2 + n)| +$$
$$|s(x + 3) - r(x + 3 + n)| + \tfrac{1}{2}|s(x + 4) - r(x + 4 + n)|$$

wherein n = −4, −3, −2, . . . 3, 4.

In Expression (1), n denotes how many pixels the standard data is shifted from the reference data. When the correlation value H(n) is minimum, n expresses a relative amount of movement of an object. That is, for example, H(0) is the minimum value when an object is not moving at all and camera shake does not occur, and H(2) is the minimum value when an object moves to the right by as much as two pixels.

The correlation calculation with the standard data (a9 to a13) and the reference data (b5 to b17) shown in FIG. 9(b) is described hereinafter. The correlation value for the case where n is from −4 to 4 is calculated by Expression (1) as follows:

$$H(-4) = \tfrac{1}{2}|a9 - b5| + |a10 - b6| + |a11 - b7| + \qquad (2)$$
$$|a12 - b8| + \tfrac{1}{2}|a13 - b9|$$

$$H(-3) = \tfrac{1}{2}|a9 - b6| + |a10 - b7| + |a11 - b8| + \qquad (3)$$
$$|a12 - b9| + \tfrac{1}{2}|a13 - b10|$$

.
.
.

$$H(4) = \tfrac{1}{2}|a9 - b13| + |a10 - b14| + |a11 - b15| + \qquad (4)$$
$$|a12 - b16| + \tfrac{1}{2}|a13 - b17|$$

In this case, since the object moves to the left by as much as three pixels, H(−3) is the minimum value. When an object moves as much as one pixel, the blur amount on a film plane is 60 μm. Therefore, in the above described case, the object moves 180 μm on a film plane.

Figure 11:
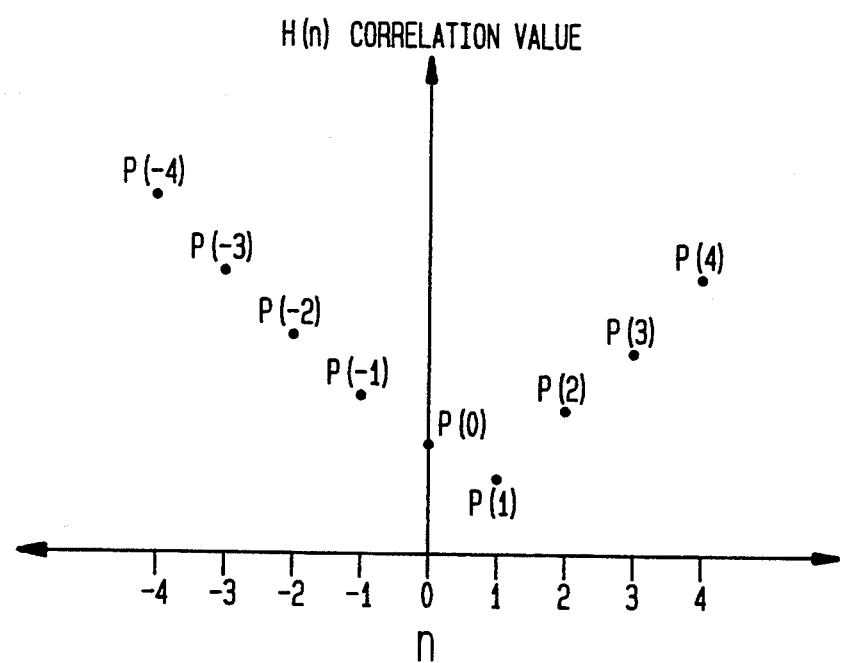
FIG. 11 is a graph showing distribution of correlation calculation values.

Next, the interpolation calculation is described. FIG. 11 is a graph showing one example of a distribution of correlation calculation values. In FIG. 11, the horizontal axis shows n, the vertical axis shows correlation values H(n), and each item of correlation data is plotted on the graph. Among the data obtained by the correlation calculating process, the degree of correlation is highest when n=1. However, for the example shown in FIG. 11, the degree of correlation is actually at a maximum when n is between 0 and 1. The interpolation calculating step is for calculating the value of n with which the degree of correlation is at a maximum.

Figure 12:
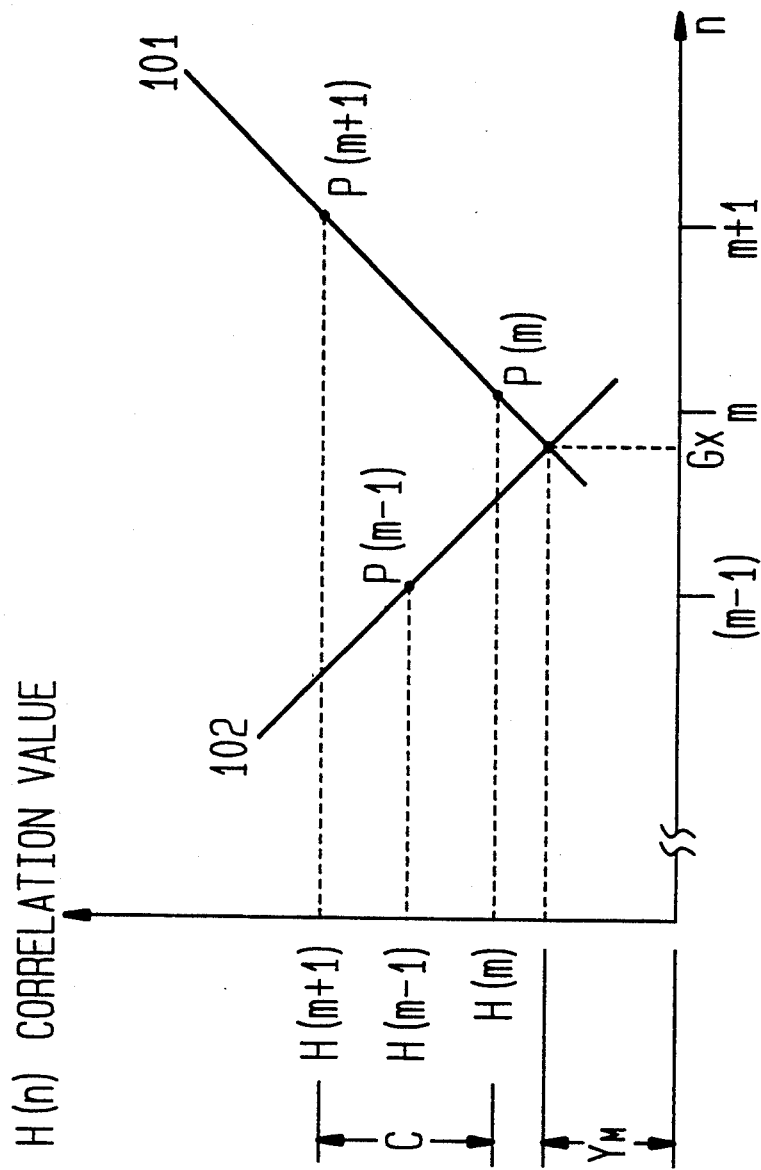
FIG. 12 is a graph for interpolation calculating.

In FIG. 12, P(m) is the minimum value of P(n) where n is an integer (n=−4, . . . , 4), and P(m−1) and P(m+1) are the values on both sides of P(m).

A straight line including P(m) and either P(m−1) or P(m+1), depending on which value is larger, is drawn (line 101 in FIG. 12). Furthermore, another straight line including P(m) and either P(m−1) or P(m+1), whichever value is smaller, is drawn (line 102). The line 102 has a slope whose sing is opposite to that of the line 101 and whose absolute value is the same as that of the line 101. The value of n which is an intersection of the lines 101 and 102 is identified as a blur pixel amount Gx in the horizontal direction. When P(−4) or P(4) is the minimum in FIG. 11, the above-mentioned interpolation calculating step is impossible. Therefore in this embodiment, the range of Gx is limited from −3.5 to +3.5. A larger value of Gx cannot be reliably detected because the blur amount is too large, and the result of the calculation is not good. The blur pixel amount Gx is calculated by the following expressions:

when $H(m - 1) < H(m + 1)$,
$$Gx = m + \tfrac{1}{2} \frac{H(m - 1) - H(m + 1)}{H(m + 1) - H(m)} \quad (5)$$

when $H(m - 1) \geq H(m + 1)$,
$$Gx = m + \tfrac{1}{2} \frac{H(m - 1) - H(m + 1)}{H(m - 1) - H(m)} \quad (6)$$

The blur pixel amount Gx, calculated as described above, denotes how many pixels the blur is to the right or left. YM/C denotes a confidence value for the blur pixel amount Gx. The values of YM and C are shown in FIG. 12 and calculated by the following expressions:

$$YM = H(m) - \tfrac{1}{2}|H(m + 1) - H(m - 1)| \quad (7)$$

$$\begin{aligned} C &= H(m + 1) - H(m) \quad (H(m - 1) < H(m + 1)) \\ C &= H(m - 1) - h(m) \quad (H(m - 1) \geq H(m + 1)) \end{aligned} \quad (8)$$

C denotes the slope of the straight line 101. The sharper the slope is, i.e., the larger C is, the higher the contrast is. The smaller the correlation value YM is, the higher the degree of correlation is. Thus, the smaller YM/C is, the higher the level of confidence is. In the present embodiment, when YM/C is 1 or more, it is determined that the confidence is low, so that the result of the calculation is regarded as not acceptable.

The practical blur amount on a film plane is calculated on the basis of the blur pixel amount Gx in the horizontal direction. As described above, in a camera according to the present embodiment, the blur amount on a film plane is 60 μm when the movement on the CCD is as much as one pixel. Therefore, a practical blur amount on a film plane in the horizontal direction Bx is calculated by the following expression:

$$Bx = 60 \times Gx \; (\mu m) \quad (9)$$

After the blur amount on a film plane is calculated as described above, a blur speed Vx is calculated. The blur speed Vx denotes the amount of movement of an object on a film plane (in the horizontal direction) per second, and is calculated by the following expression:

$$\text{Blur speed} = \frac{\text{Blur amount}}{T_i - T_{i-1}}$$

where $T_i$ is the central time of the most recent integration and $T_{i-1}$ is the central time of the preceding integration.

The blur amount and the blur speed are calculated as described above. These calculations are for calculating the blur amount and speed not only in the horizontal direction but also in the vertical direction. Therefore, the above-mentioned calculations for calculating the blur amount and speed in the vertical direction are not described here. The blur amount and the blur speed in the vertical direction on a film plane are denoted as By and Vy, respectively.

[4] Averaging Process

After the blur speed is calculated by the blur calculating operation described in Section [3] above, averaging is carried out. In the averaging process, the above described blur calculation is performed four or eight times, and then the data from those calculations is averaged. Thus, an average blur speed in the horizontal direction and one in the vertical direction are calculated, respectively. However, if the blur speed is unreliable (the contrast is too low, YM/C is too large, or the blur amount is too much, etc.) it is not added into the calculation. When the number of effective data points is less than three, the average blur speed at that time is considered to be unreliable. A blur detecting operation in which one average blur speed is calculated for four blur speeds is referred to as a four-cycle blur detection. A blur detecting operation in which one average blur speed is calculated for eight blur speeds is referred to as an eight-cycle blur detection.

Table 1 shows an example of data that might be obtained for the blur speed. The averaging process is described with reference to Table 1. The embodiment in Table 1 is for the case of an eight-cycle blur detection. The blur speed data that is labelled "no good" in Table 1 is for the case in which the contrasts of all the blocks in the island are low and there is no standard area, or the blur amount is too great (more than 3.5 pixels) and blur detection is not possible. The data that is judged to be no good is not used for the averaging process. When YM/C is 1 or more as described above, it is determined that the confidence value is low, so that the data at that time is not used for averaging. Therefore, the average blur speed in this set is calculated by averaging the blur speeds in i=3, 6, 7, and is expressed as follows:

(3+2+5)/3=3.3 (mm / s)

TABLE 1

| i | 1 | 2 | 3 | 4 | 5 | 6 | 7 | 8 |
|---|---|---|---|---|---|---|---|---|
| V | 5 | no good | 3 | no good | 8 | 2 | 5 | no good |
| YM/C | 1.1 | no good | 0.8 | no good | 1.2 | 0.7 | 0.6 | no good |

After the average blur speed is calculated as described above, a weighting calculation in the main and sub islands is performed. The weighting calculation is for the purpose of identifying the main object movement correctly. The weighting calculation is described with reference to Table 2.

First, for the case in which the average blur speed in the main island and that of the sub island are both effective, an output blur speed Bo is calculated by the following expression:

when $Bm \leqq Bs$, $$Bo = Bm \tag{12}$$

when $Bm > Bs$, $$Bo = (Bm + Bs)/2 \tag{13}$$

where Bm = the average blur speed in the main island, and
Bs = the average blur speed int he sub island.

Namely, when the average blur speed in the main island is not faster than that of the sub island, the data in the main island is used as the output blur speed Bo. However, when the average blur speed in the main island is faster than that of the sub island, the averaged value of the speed data for the main and sub islands is used as the output blur speed Bo. Thus, the main island and the island where the average blur speed is slower are weighted more than the sub island and the island where the average blur speed is faster, respectively. This is because the blur speed of the background is faster than that of the main object in most cases.

For example, when panning is carried out so that a photographer can keep up with a moving object, the main object is almost at rest, but the background is moving fast. Therefore, when the blur amount of the main island is slower, its data is used as Bo, and when the blur speed of the sub island is slower, the averaged value of the speed data is used as Bo.

However, when the main island and the sub island are in the same focus detecting zone (FIG. 2(d) to 2(g)), the possibility that the sub island contains the background is extremely weak, but the possibility that it contains the main object is strong. Therefore, in this case, the island where the average blur speed is fast is weighted, and the faster blur speed is used as Bo (or the average of the two blur speeds is used as Bo). In this case, Bo is calculated by the following conditions:

when the main and sub islands are in the same zone, and $Bm \leqq Bs$, $$Bo = Bs \tag{14}$$

and when the main and sub islands are in the same zone, and $Bm > Bs$, $$Bo = Bm \tag{15}$$

Alternatively, Bo can be calculated by the following approach:

when the main and sub islands are in the same zone, $$Bo = (Bm + Bs)/2 \tag{16}$$

Second, for the case in which the average blur speed in the main island is effective but that of the sub island is not, the data from the main island is used as Bo. Conversely, for the case in which the data of the main island is not reliable and that of the sub island is effective, the data from the sub island is used as Bo. When data from both the main and sub islands are not reliable, the output blur speed Bo is also not reliable.

Furthermore, for the case in which the sub island is not selected in the island selecting process and the blur detection is carried out only by means of the main island, when the data of the main island is effective it is used as Bo. When the data is not reliable, the output blur speed Bo is also not reliable.

By the above described weighting process, the output blur speed Bo, which is the final output of the blur speed, is calculated. This process is summarized in Table 2 below:

TABLE 2

| Main island | Sub island | Output |
|---|---|---|
| Effective | Effective | Expression (12), (13), (14), or (15) (Or Expression (12), (13) or (16)) |
| Effective | No good | Data of Main island |
| No good | Effective | Data of Sub island |
| No good | No good | No good |
| Effective | Nothing | Data of Main island |
| No good | Nothing | No good |

Figure 13:
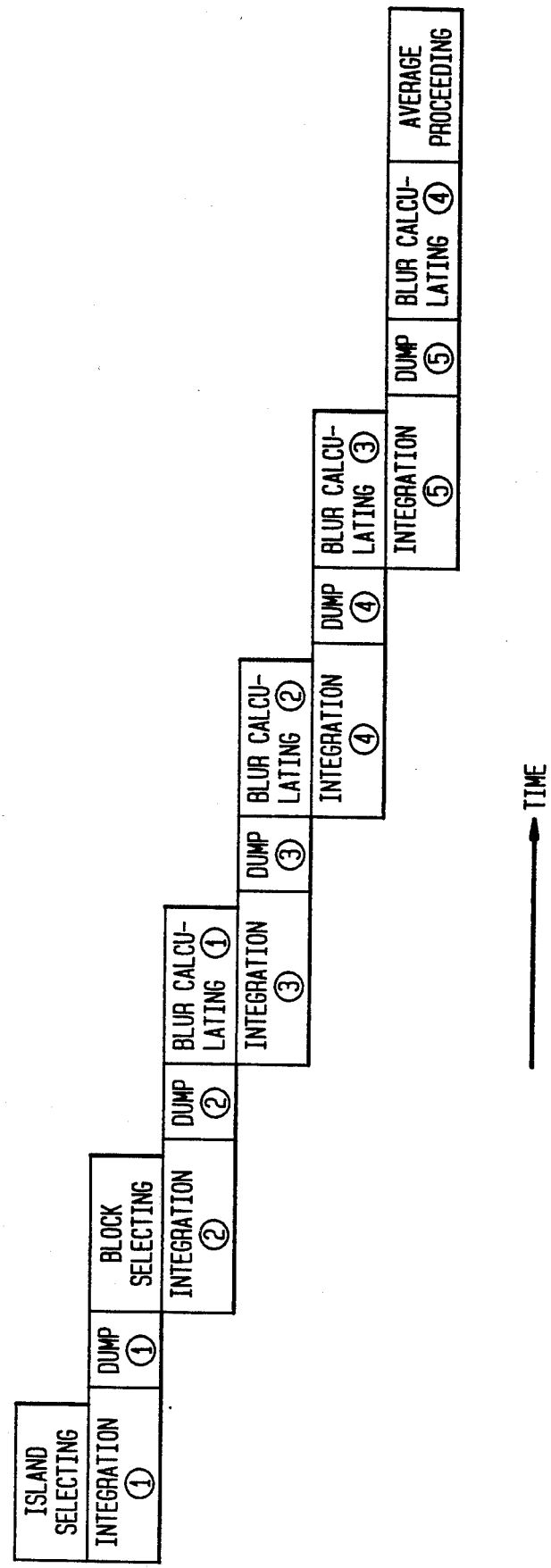
FIG. 13 is an illustration showing a four-cycle blur detecting operation.
Figure 14:
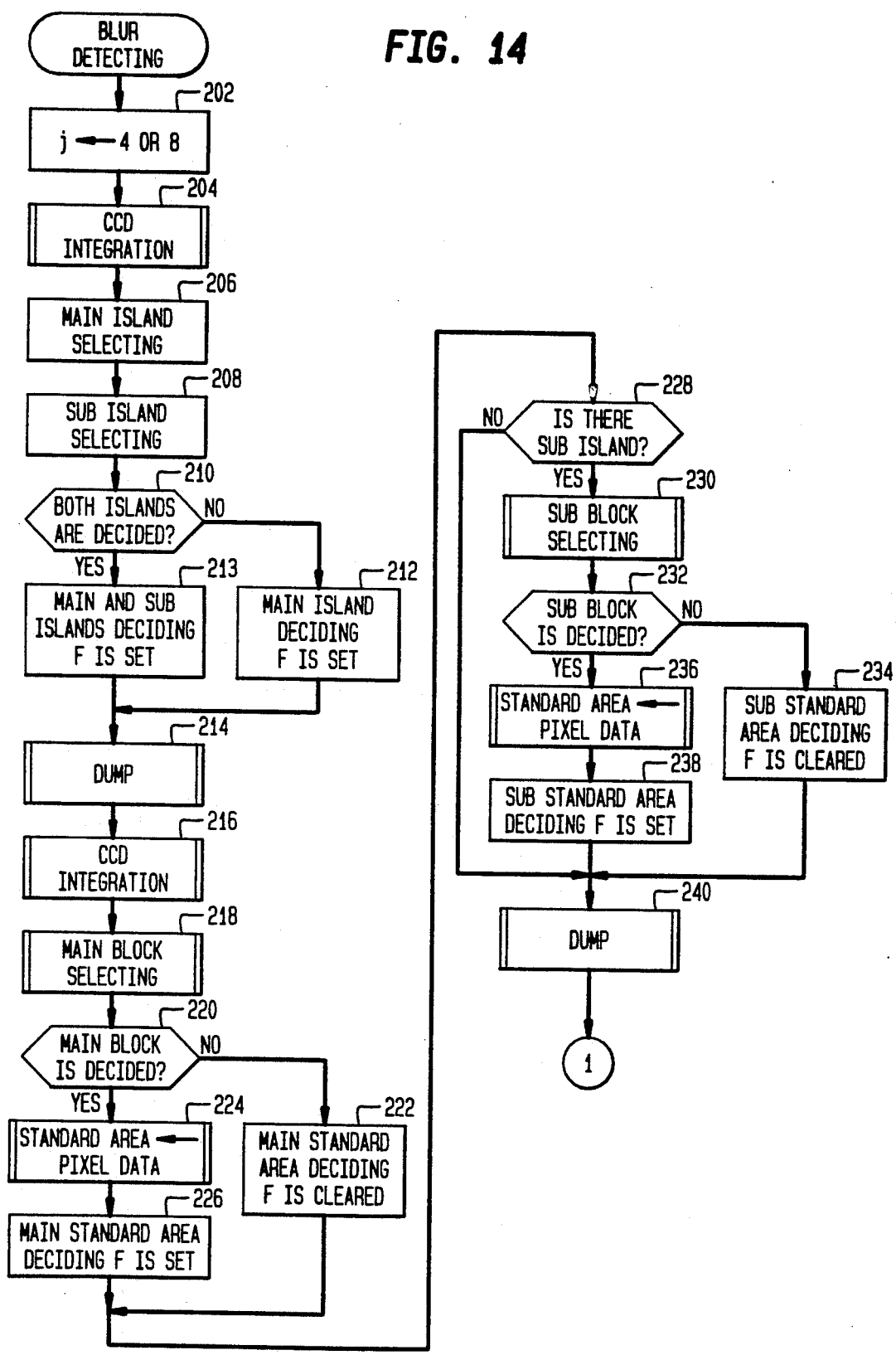
FIG. 14 is a flowchart showing blur detection.
Figure 15:
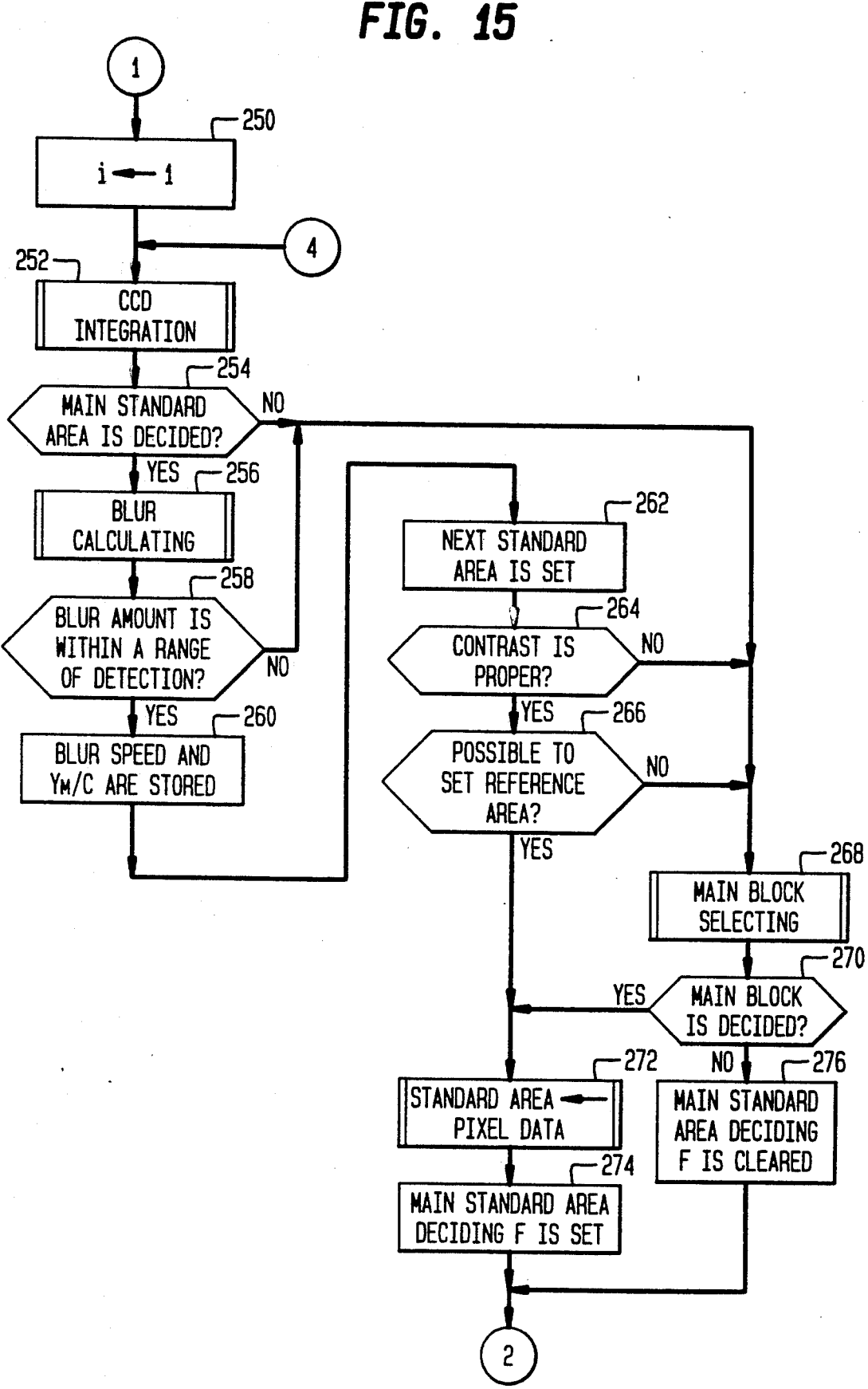
FIG. 15 is a continuation of the flowchart showing blur detection.

FIG. 13 shows the blur detecting operation described in Sections [1]–[4] above. In FIG. 13, the horizontal axis shows time. In the particular example of FIG. 13 the blur detection is performed for four cycles at a time.

The first step of the blur detecting process is the CCD integration (Integration ①). At the same time the island selection is also performed. This island selection is carried out as described above in Section [1]. After the integration ① is finished, pixel data from the two selected islands are dumped and stored in respective memory banks (Dump ①). The CCD integrating time is dependent on object luminance as described before with reference to FIG. 4. Therefore, when the object luminance is too low, it takes a long time to finish the integration. In the present embodiment, the longest time for the integration in the blur detecting process is 10 ms. When it takes more than 10 ms for the integration, the object luminance is determined to be so low that the next blur calculating step is not possible.

The second step of the blur detecting process is also the CCD integration (Integration ②). At the same time, the block selecting step is performed in the two islands, respectively. This block selection is carried out as described in Section [2] above. After the integration ② is finished, pixel data from each island is dumped in the same manner as the first step (Dump ②). After the dump ② step is finished, an integration ③ and a blur calculation ① are carried out at the same time. In the blur calculation ①, the correlation calculating step and the interpolation calculating step are carried out with the standard area set in the block selecting step and the reference area of the pixel data stored in the dump ②. Thus, the blur amount and the blur speed are calculated. Another standard area for the next blur calculating step is set according to the calculated blur amount.

After the integration ③ is finished, pixel data from each island is also dumped in the same way (Dump ③). Then, a blur calculation ② is performed. In the blur calculation ② the correlation calculating step and the interpolation calculating step are carried out with standard area set in the blur calculation ① and the reference area of the pixel data stored in the dump ③. Thus, the blur amount and the blur speed are calculated. Hereinafter, the CCD integration and the blur calculating steps are repeated in the same way. When a blur calculation ④ is finished, the averaging process is carried out. In the averaging process, as described in Section [4] above, the four blur speeds calculated in the blur calculations ① to ④ are averaged. Then, the weighting is carried out on the basis of the data of the main island and the sub island.

By performing the above described blur detecting operation, the output blur speed Bo can be calculated and generated as a final output. In the eight-cycle blur detection, blur calculations ① to ③ are carried out in the same order as the example of FIG. 13. Then, the data of the eight blur speeds is averaged.

FIGS. 14 to 17 are flowcharts of the blur detecting operation, which will be further described in detail with reference to these flowcharts. In step #202, the microcomputer determines whether the blur detection is being carried out for the first time, and sets j at 4 or 8. In step #204, the CCD integration starts. At the same time as the CCD integration, the island selection is carried out in steps #206 and #208. In step #210, a determination is made whether both of the main and sub islands are selected. When the answer is "NO", that is, when no island fulfills the conditions of a sub island, the program goes to step #212. In step #212, only a main island deciding flag is set. When the answer is "YES" in step #210, the program goes to step #213. In step #213, main island and sub island deciding flags are set. After selecting the islands, when the CCD integration is finished, the pixel data is dumped and stored in a memory bank in step #214.

After the dumping, the CCD integration starts again in step #216. At the same time as the integration, a main block is selected in step #218. In the main block selecting step, a block is selected whose defocus amount is least or whose contrast is highest in the main island. In step #220, a determination is made whether the selected main block fulfills the condition that the contrast is not less than the predetermined value. When the answer in the step #220 is "YES", the pixel data of the block is stored as standard pixel data in step #224. Then, the main standard area deciding flag is set in step #226. To the contrary, when all the blocks in the island are low-contrast and no main block fulfilling the condition is selected, the main standard area deciding flag is cleared in step #222.

In step #228, a determination is made whether there is a sub island. This is determined according to the result of the steps #212 and #213. When there is a sub island, a sub block is selected and a sub standard area deciding flag is set in steps #230 to #238. The operation in steps #230 to #238 is the same as the case of the main block. Therefore, the description of the operation is omitted here. When there is no sub island, the program goes to step #240 directly since a sub block cannot be selected. In step #240, the pixel data is dumped after finishing the CCD integration.

After the island selection and the block selection are finished, the blur calculation starts. The blur calculating operation is described with reference to FIG. 15. In step #250, i is set at 1. The parameter i denotes the number of times that the blur calculating process is carried out. Every time the blur calculating step is performed, 1 is added to i. In step #252, the CCD integration starts. In step #254, a determination is made whether the main standard area has been decided. When the main standard area has been decided, the blur calculation of the main island is performed in step #256. In this blur calculation, as described before, the correlation and interpolation calculating steps are carried out between the standard area and the reference area. Then, the blur amount, the blur speed, and YM/C are calculated. In step #258, a decision is made whether the calculated blur amount is within a range that is possible to be detected. In the present embodiment, when the blur pixel amount Gx exceeds the range between $-3.5$ and $+3.5$, the data is not reliable and blur detection is not possible. When the blur pixel amount Gx is within the range, the blur speed is stored in step #260. At that time, the value of YM/C is also stored. After the blur speed is stored, the next standard area is set in step #262 according to the calculated blur pixel amount Gx. In steps #264 and #266, a decision is made whether the contrast of the set standard area is equal to or greater than the predetermined value and whether the reference area is within a range possible to set. When either of the answers in the two steps is "NO", the program goes to step #268 and a main block is selected over again. In this main block selecting step, a block whose contrast is highest in the main island is selected as a main block. The main block selection in step #268 is performed not only in the case where the answer is "NO" in step #264 or step #266. It is also performed in the case where a main standard area is not decided yet in step #254, in the case where the blur pixel amount calculated in step #258 is too large, and in other cases. In step #270, a determination is made whether the main block selected in step #268 fulfills the condition that the contrast is equal to the predetermined value or greater. When it does, the program goes to step #272.

When a main standard area is set in the steps #262 to #266 or #268 to #270, the pixel data of the main standard area is stored as standard pixel data in step #272. In step #274, the main standard area deciding flag is set. On the contrary, when a main standard area is not set, the main standard area deciding flag is cleared in step #276.

Thus, the blur calculation in the main island and the setting of the next main standard area are completed. Then, the blur calculation in the sub island and the setting of the sub standard area are carried out.

Figure 16:
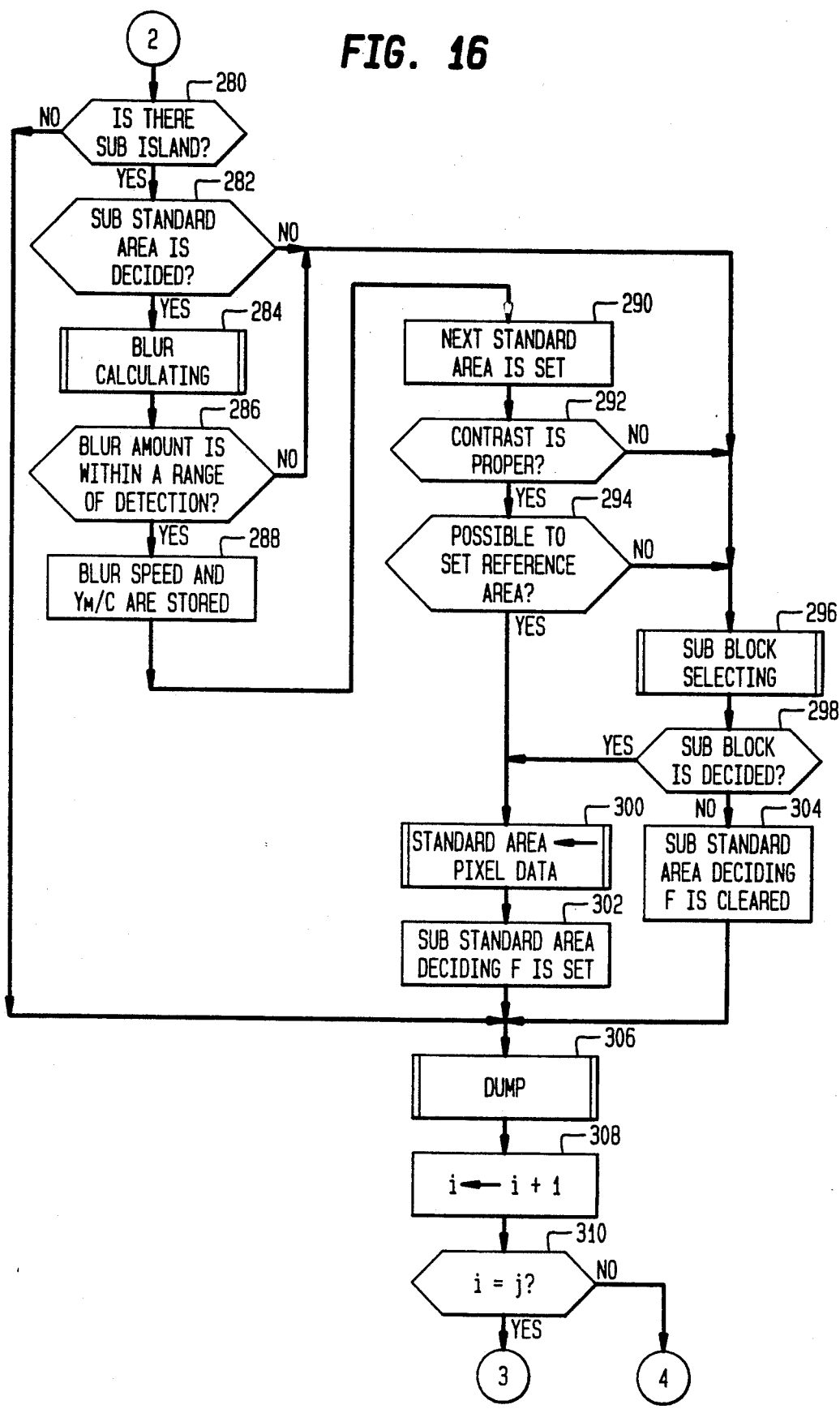
FIG. 16 is a further continuation of the flowchart showing blur detection.
Figure 17:
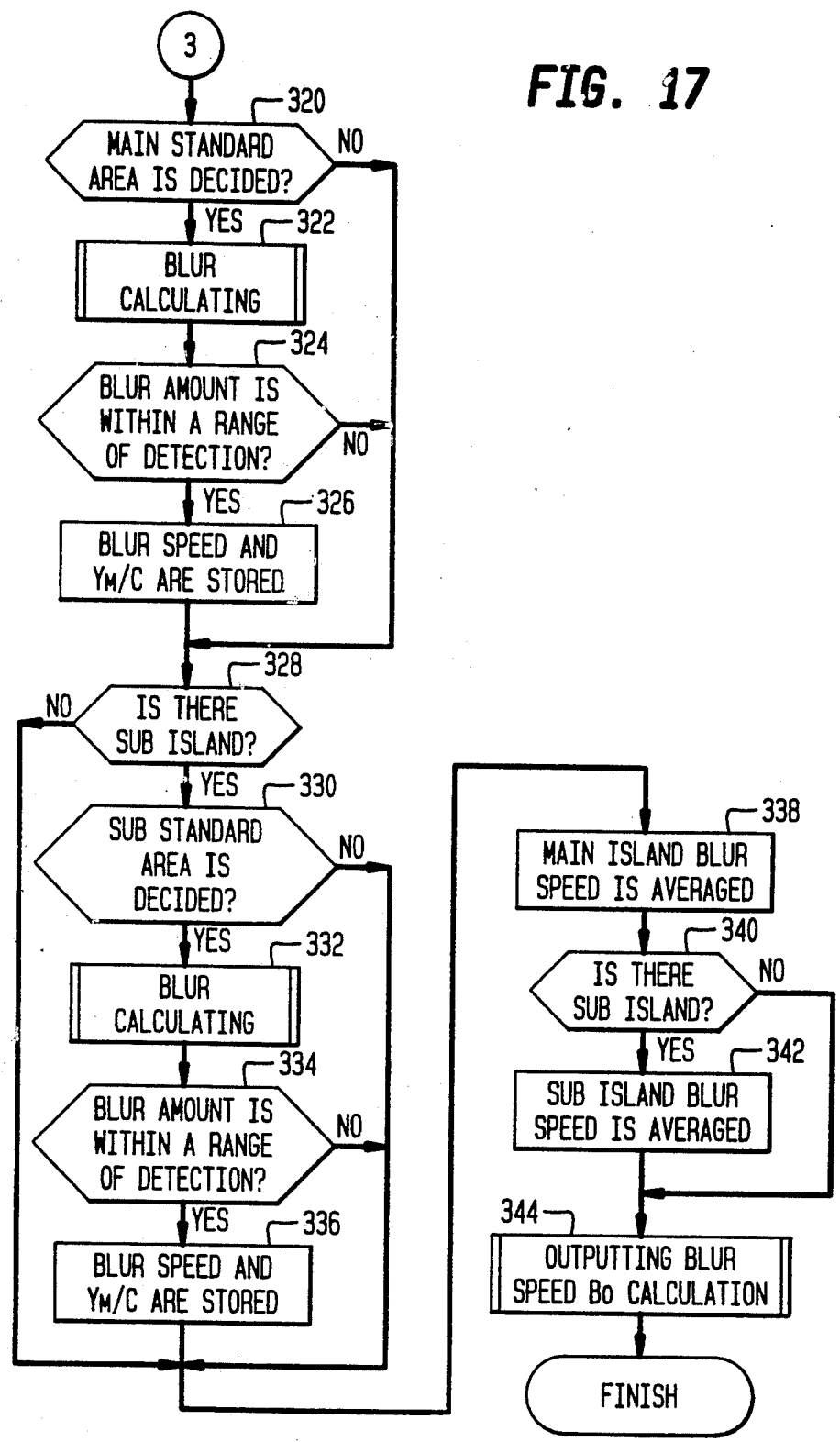
FIG. 17 is the completion of the flowchart showing blur detection.

In FIG. 16, a determination is made whether there is a sub island in step #280. When there is no sub island, the program goes to step #306 without the blur calculation and the standard area setting step. When there is a sub island, the blur calculation in the sub island and the sub standard area setting step are performed in steps #282 to #304. This operation is the same as that of the main island. Therefore, the description is omitted here.

After the blur calculation in the main and sub islands and the standard area setting are performed as described above, the pixel data is dumped in step #306 as soon as the CCD integration is finished. Following the completion of the dumping in step #306, i is set at i+1 in step #308. In step #310, a determination is made whether i=j. The parameter j can be 4 or 8, which is set in the step #202. When i does not equal the value of j, the program goes back to step #252, and the blur calculating process is performed again. After that, the blur calculating process is repeated until i=j. When i=j, the final blur calculating process starts as shown from step #320 in FIG. 17.

In step #320, a determination is made whether the main standard area has been decided. When the main standard area has been decided, the blur calculation is carried out in step #322. After checking the result of the calculation, the blur speed is stored (in steps #324 and #326). When the main standard area has not been decided, the program goes directly to step #328 without the blur calculation.

In step #328, a determination is made whether there is a sub island. In the case where there is a sub island, a determination is made in step #330 whether the sub standard area has been decided. When the sub standard area has been decided, the blur calculation is performed. Then, the result of the calculation is checked, and the blur speed is stored (in steps #332 to #336). In the case that there is neither a sub island nor a sub standard area, the program goes to step #338 directly. Thus, the final blur calculation is finished. Each blur speed in the main island and the sub island is stored every four or eight cycles. (When there is no sub island, only the blur speed in the main island is stored.) By the above described operation, the blur calculation is performed four or eight times.

Then, the data averaging starts. In step #338, the blur speed data of the main island is averaged. At that time, as described before, YM/C is checked so that the data whose confidence value is low is determined to be no good and should not be used for averaging. Furthermore, in the case where the number of items of effective data is less than three, the average blur speed in the main island is judged to be no good. After calculating the average blur speed in the main island in step #338, a determination is made whether there is a sub island in step #340. When there is, the blur speed data is averaged in the same way as the case of the main island. When there is not, there is no average blur speed of the sub island. Following the above described calculation of each average blur speed in the main and sub islands, the weighting operation is performed in step #344. In the weighting operation, as described before, by comparing the average blur speeds in the main and sub islands, the final output blur speed Bo is generated.

FIG. 18 shows a "movement indicator" that can be used to inform the camera user of the amount of movement of the main object. The movement indicator indicates what texture the photograph of the scene will have. As the indicating No. increases, the photograph becomes clearer and at rest. To the contrary, as the indicating No. decreases, the photograph shows greater movement of an object. In the present embodiment, the indicating device is provided in a view-finder. Table 3 below shows the indicating No. of the movement indicator under various conditions. In general photography with the same object, the faster the shutter speed and the shorter the focal length of a photographing lens, the sharper and clearer the photographed scene is. However, in the embodiment shown in Table 3, the indicating No. is changed not only according to the shutter speed and the focal length, but also according to the blur data.

The movement indicator is described with exemplary numerical values in Table 3. For example, suppose the focal length of a photographing lens is 100 mm and the shutter speed is 1/125. Under these conditions, which are highlighted by the bold lines in the table, when the output blur speed Bo calculated by the blur detecting device of the present invention is 30 mm/s, the movement indicator displays the indicating No. 2. When the focal length and the shutter speed are the same and the blur speed Bo is 10 mm/s, the movement indicator displays the indicating No. 3. When the blur speed Bo is 1 mm/s, it displays the indicating No. 4.

In the embodiment shown in Table 3, the movement indicator is controlled to display higher indicating No. as the focal length becomes shorter, the shutter speed becomes faster, and the blur speed becomes slower. As described above, in the present embodiment, a photographer can envision the movement of an object on a printed photo at the time when he views the object through the view-finder of a camera.

TABLE 3

| Conditions | | | 1/1000 or less | 1/500 | 1/250 | 1/125 | 1/60 | 1/30 | 1/15 | 1 or more |
| --- | --- | --- | --- | --- | --- | --- | --- | --- | --- | --- |
| $f \geq 180$ mm | 60 mm $\leq f <$ 180 mm | $f <$ 60 mm | | | | | | | | |
| Bo $\geq$ 5 mm/s | Bo $\geq$ 25 mm/s | | 5 | 4 | 3 | 2 | 1 | 1 | 1 | 1 |
| Bo $<$ 5 mm/s | 1.5 mm/s $\leq$ Bo $<$ 25 mm/s | Bo $\geq$ 20 mm/s | 5 | 5 | 4 | 3 | 2 | 1 | 1 | 1 |
| | Bo $<$ 1.5 mm/s | Bo $<$ 20 mm/s | 5 | 5 | 5 | 4 | 3 | 2 | 1 | 1 |

Thus, a complete cycle of the blur detection is completed.

As described above, the blur detecting device of the present invention operates in a camera capable of multi-focus detecting. It determines which point of a main object is in the photographic scene and detects the blur of the object based on the image data of the image sensor corresponding to that point. By using this detecting method, wherever a main object is in the photographic scene, the blur can be precisely detected. In the above-mentioned embodiment, a point for the blur detection is selected according to the result of the focus detection. However, the present invention is not restricted to this embodiment. For example, the point for the blur detection can be selected according to the result of the light measuring which is performed over plural points. The blur data detected by the blur detecting device of the present invention can be used for many kinds of control concerned with blur, such as blur warning and blur indicating. Some of these applications are described hereinafter.

As another embodiment, a panning mode using the above-mentioned blur detecting device is described hereinafter. Panning is one technique used in photography to express movement. During panning, a photographer follows a moving object while the shutter is open. In a picture photographed by panning, the main object is at rest and the background is flowing in the horizontal direction, so that movement is expressed. A purpose of the panning mode is to express movement clearly in the photograph. In the panning mode, a blur is detected by using the above-mentioned blur detecting device, and the shutter speed is controlled. That is, when the blur of the main object (a relative blur between a camera and the main object) is small, the shutter speed is controlled to be slower and when the blur of the main object is large, the shutter speed is controlled to be faster. By this control, when an advanced photographer who is used to taking photographs performs a panning technique, the shutter speed becomes slower, so that the background in the printed photograph is flowing in the horizontal direction and the printed photograph is full of movement. When a beginner carries out a panning operation, blurring of the main object can be prevented.

The operation of the blur detecting device of the present invention under the panning mode is described hereinafter. Switching operation from a normal photographing mode to the panning mode is carried out by means of a mode switching portion 20 shown in FIG. 3. In the panning mode, the decision of resting/moving shown in FIG. 6 is not performed, and continuous AF is carried out all the time. The mode switching portion 20 can be implemented with any of the following members: an operating member, such as a switch; a card which is capable of being mounted on a camera and which provides data to the camera by electrical signals (digital signals); and a bar-code for providing data to the camera as optical signals.

Figure 19:
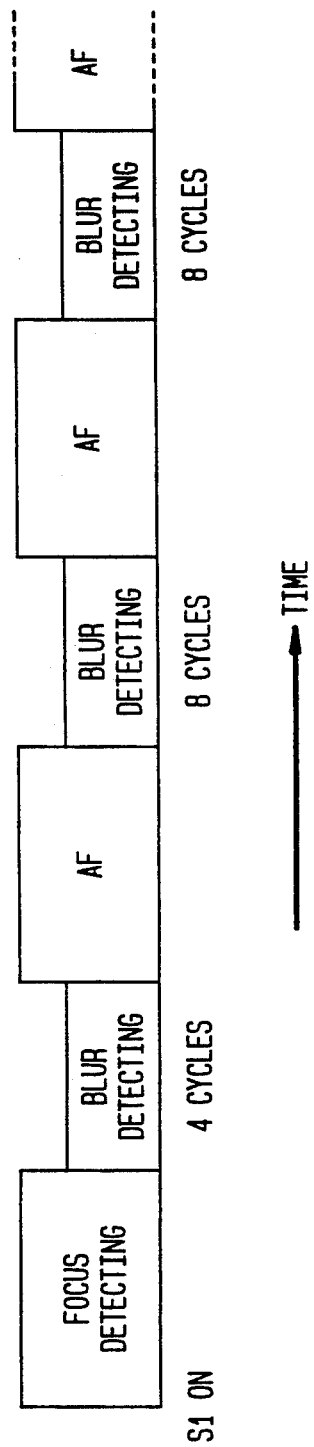
FIG. 19 is a flowchart showing a sequence of blur detection in a panning mode.

FIG. 19 shows the sequence of blur detection in the panning mode. In the standard photography mode, as shown in FIG. 4, the AF operation is repeated in an interval of 0.5 second or more between one blur detecting operation and the next blur detecting operation. However, in the panning mode, as shown in FIG. 19, an AF operation and blur detection are alternately carried out without concern over the interval of 0.5 second. The reason for this difference is that movement of the main object can be detected more precisely by using a greater amount of blur data, since the main object is moving at a high speed during panning. This blur detection and the AF operation are also repeated until the release operation starts after switch S2 is turned on.

Figure 20:
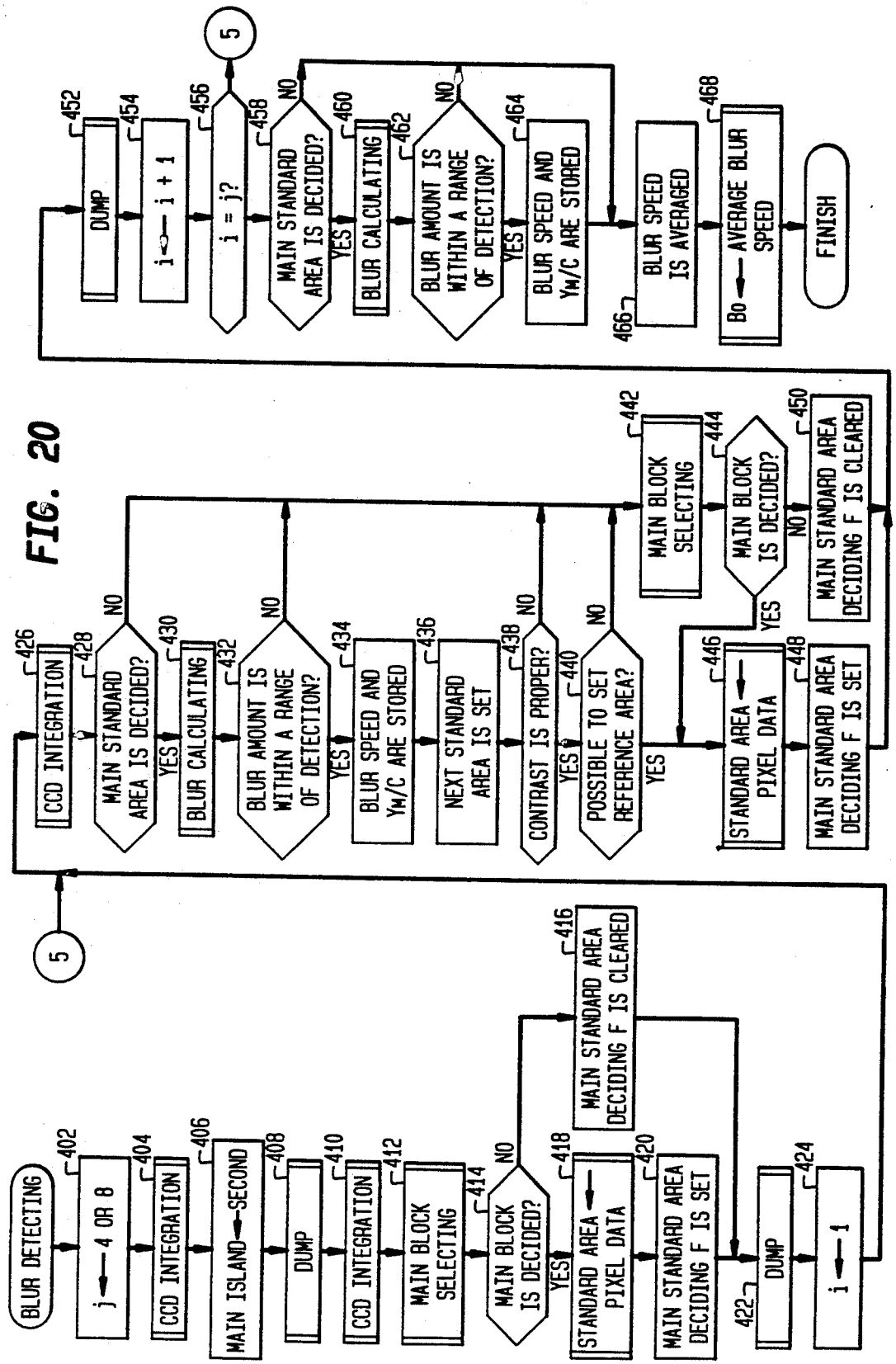
FIG. 20 is a flowchart showing a blur detecting operation performed in a panning mode.

FIG. 20 is a flowchart showing the blur detecting operation in the panning mode. As shown in FIG. 20, in the panning mode, the second island is selected as a main island (in step #406), and a sub island is not selected. The blur detection is performed only with the second island. This is because the calculating time is required to be as short as possible, to detect high speed object movement during panning. Namely, the calculating time and the dumping time of the imaging data are cut almost in half by selecting only one island for the blur detection. The reason why the second island is selected as a main island is that a main object is usually placed at the center of the picture when the camera is moved together with a moving object. Moreover, during panning, the main object is moving in the horizontal direction like a car in many cases, so that the blur data in the horizontal direction is mainly needed. Therefore, in the panning mode, only the second island is selected for the blur detection.

The operation following the island selection in the panning mode is the same as the case of the normal photography mode. That is, it is the same operation as the case where the blur detection is performed only with the main island, i.e. without selecting a sub island. Therefore, the description is omitted here.

After the blur data has been calculated by the above described blur detecting method, exposure correction is performed on the basis of the calculated blur data. FIG. 21 shows an example of an exposure program in the panning mode of a camera using the present invention. The straight line shows a program line at the time when the output blur speed Bo is 3 mm/s. The program line shifts to the right or left according to the blur amount. More precisely, when the blur amount is large, the line shifts to the faster shutter speed side. When the blur amount is small, the line shifts to the slower shutter speed side. Program lines for these two cases are shown by broken lines. In the present embodiment, the shifting range is from 1/30 to 1/125 sec. When $Bo \leq 1.5$ mm/s, the shutter speed is 1/30, and when $Bo \geq 6$ mm/s, the shutter speed is 1/125. By shifting the program lines as described above, the shutter speed can be controlled according to the blur amount, even for an object whose Ev value is the same.

Under the above described exposure control, when an advanced photographer who is used to taking photographs employs a panning technique, the shutter speed is slower, so that the background in the printed photograph is flowing in the horizontal direction and the printed photograph is full of movement. When a beginner uses panning, he may not be able to keep the main object centered in the scene. With the exposure control technique of the present invention, however, blurring of the main object can be prevented.

In the above described embodiment, plural line sensors for the focus detection are also used for the blur detection. However, the blur detection in the present invention is not restricted to the above-mentioned embodiment where line sensors are used. For example, an area sensor (two-dimensional) can be also applied to the present invention. An embodiment using an area sensor is described hereinafter with reference to FIG. 22. As shown in FIG. 22, the range of an area sensor is divided into nine portions, from an area 1 to an area 9. First, in these areas the focus detection is carried out by extracting and evaluating high frequency image signals, as known.

According to the result of the focus detection, an area where there is a main object is selected from among the areas 1–9. Then, the blur detection is performed in the selected area. This is possible by calculating the correlation between image signals having an interval (this method is also known). The area selection can be performed according to not only the result of the focus detection but also the outline of a main object, the color of a main object, and such.

The present invention may be embodied in other specific forms without departing from the spirit or essential characteristics thereof. The disclosed embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A camera capable of detecting focus conditions at a plurality of areas in an objective field, comprising:
   image sensing means for producing image data in accordance with an image formed on said image sensing means;
   focus detecting means for detecting focus conditions at the plurality of areas based on said image data;
   blur detecting means for detecting a possible blurring of a photograph of said image based on the image data, said blur detecting means being capable of detecting possible blurs at said plurality of areas in an objective field;
   selecting means for selecting an area from said plurality of areas;
   driving means for driving a photographing lens to a focus point based on a focus condition detected at said selected area; and
   controlling means for controlling said blur detecting means to detect a possible blur at said selected area.

2. A camera as claimed in claim 1, further comprising second selecting means for selecting a second area from said plurality of areas, wherein said controlling means controls said blur detecting means to detect blur in one direction based on the image data from said one area and to detect blur in a direction perpendicular to said one direction based on the image data from the second area.

3. A camera as claimed in claim 2, wherein said second selecting means selects an area whose distance to said one area is short relative to the distance from said one area to the others of said plurality of areas.

4. A camera as claimed in claim 2, wherein said second selecting means can determine that there is no area which is appropriate as a second area for blur detection and said controlling means is responsive to said determination to control said blur detecting means to detect blur in only one direction based on the image data from said one area.

5. A camera as claimed in claim 1, wherein said image sensing means includes a plurality of line sensors.

6. A camera as claimed in claim 1, wherein said image sensing means is an area sensor and said blur detecting means includes means for dividing said area sensor into said plurality of areas.

7. A camera capable of detecting focus conditions at a plurality of areas in an objective field, comprising:
   a plurality of image sensing means, respectively corresponding to said plurality of areas, for generating image data in accordance with images formed on the image sensing means;
   focus detecting means for detecting focus conditions at the plurality of areas based on said image data;
   blur detecting means for detecting a possible blurring of a photographed image based on the image data, said blur detecting means being capable of detecting possible blurs at said plurality of areas;
   selecting means for selecting any one of said plurality of areas;
   driving means for driving a photographing lens to a focus point based on a focus condition detected at said one area; and
   controlling means for controlling said blur detecting means to detect a possible blur at said one area.

8. A camera as claimed in claim 7, further comprising second selecting means for selecting a second area from said plurality of areas, wherein said controlling means controls said blur detecting means to detect blur in one direction based on the image data from said one area and to detect blur in a direction perpendicular to said one direction based on the image data from the second area.

9. A camera as claimed in claim 8, wherein said second selecting means selects an area whose distance to said one area is short relative to the distance form said one area to the others of said plurality of areas.

10. A camera as claimed in claim 8, wherein said second selecting means can determine that there is no area which is appropriate as a second area for blur detection and said controlling means is responsive to said determination to control said blur detecting means to detect blur in only one direction based on the image data from said one area.

11. A camera capable of detecting focus conditions at a plurality of areas in an objective field, comprising:
   image sensing means for generating image data in accordance with an image formed on the image sensing means;
   focus detecting means for detecting focus conditions at the plurality of areas based on said image data;
   blur detecting means for detecting a possible blurring of a photograph based on the image data, said blur detecting means being capable of detecting possible blurs at a plurality of areas in an objective field;
   driving means for driving a photographing lens to a focus point based on a focus condition at a prescribed area; and
   controlling means for controlling said blur detecting means to detect blurs in two directions perpendicular to each other based on the image data from said prescribed area.

12. A camera capable of detecting focus conditions at a plurality of areas in an objective field, comprising:
   image sensing means for generating image data in accordance with an image formed on the image sensing means;
   focus detecting means for detecting focus conditions at the plurality of areas based on said image data;
   blur detecting means for detecting a possible blurring of a photograph based on the image data, said blur detecting mean being capable of detecting possible blurs at said plurality of areas;
   manual selecting means for selecting an area from said plurality of areas in response to a manual operation by a photographer;
   driving means for driving a photographing lens to a focus point based on a focus condition detected at said manually selected area; and
   controlling means for controlling said blur detecting means to detect a possible blur at the selected area.

13. The camera of claim 12 wherein said manual selecting means includes means for switching said camera between a normal mode of photography and a panning mode, and wherein said manual selecting means selects a predetermined one of said plurality of areas when the panning mode is selected.

14. The camera of claim 13 further including exposure control means for controlling exposure in accordance with the amount of blur that is detected at said predetermined area when the panning mode is selected.

15. A camera capable of detecting focus conditions at a plurality of areas in an objective field, comprising:
   image sensing means for generating image data in accordance with an image formed on the image sensing means;
   focus detecting means for detecting focus conditions at the plurality of areas based on said image data;
   blur detecting means for detecting a possible blurring of a photographed image based on the image data, said blur detecting means being capable of detecting possible blurs at each of said plurality of areas;
   first selecting means for selecting a main one of said plurality of areas;
   driving means for driving a photographing lens to a focus point based on a focus condition detected at said main area;
   second selecting means for selecting a sub area from said plurality of areas; and
   controlling means for controlling said blur detecting means to detect a possible blur based on the image data from at least one of said main and sub areas.

16. The camera of claim 15 wherein said blur detecting means determines whether the image data from each of said main and sub areas is reliable for blur detection.

17. The camera of claim 16 wherein said controlling means controls said blur detecting means to detect a possible blur on the basis of the image data from both said main and sub areas when the image data from both of said areas is reliable for blur detection.

18. The camera of claim 17 wherein the detection of a possible blur is weighted in favor of the image data from said main area when the image data from both of said areas is reliable for blur detection.

19. The camera of claim 16 wherein said controlling means controls said blur detecting means to detect a blur on the basis of the image data from only one of said main and sub areas when the image data from the other of said areas is not reliable for blur detection.

20. A camera having a blur detecting device, comprising:
a plurality of image sensing means located separately from each other, at locations respectively corresponding to a plurality of areas in an objective field, for generating image data in accordance with an image formed on the image sensing means;
blur detecting means for detecting a possible blurring of a photograph of said image based on the image data, said blur detecting means being capable of detecting possible blurs at said plurality of areas; and
controlling means for controlling said blur detecting means to detect a possible blur based on image data generated by said image sensing means.

21. A camera capable of detecting focus conditions at a plurality of areas in an objective field, comprising:
image sensing means for generating image data in accordance with an image formed on the image sensing means;
focus detecting means for detecting focus conditions at the plurality of areas based on said image data;
blur detecting means for detecting a possible blurring of a photograph based on the image data, said blur detecting means being capable of detecting possible blurs at said plurality of areas;
selecting means for selecting an area from said plurality of areas based on respective reliabilities of the detected focus conditions;
driving means for driving a photographing lens to a focus point based on a focus condition detected at the selected area; and
controlling means for controlling said blur detecting means to detect a possible blur at the selected area.

22. The camera of claim 21, wherein said reliabilities of the focus conditions depend on whether a focusing operation is possible, based on data pertaining to the focus conditions.

* * * * *